United States Patent
Sato

(10) Patent No.: US 9,007,666 B2
(45) Date of Patent: Apr. 14, 2015

(54) DETERMINING WHETHER AN IMAGE IS COLOR

(71) Applicant: Canon Kabushiki Kaisha, Tokyo (JP)

(72) Inventor: Hideo Sato, Tachikawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/735,972

(22) Filed: Jan. 7, 2013

(65) Prior Publication Data

US 2013/0120811 A1    May 16, 2013

Related U.S. Application Data

(62) Division of application No. 13/019,909, filed on Feb. 2, 2011, now Pat. No. 8,351,097.

(30) Foreign Application Priority Data

Mar. 8, 2010 (JP) ................................. 2010-050853

(51) Int. Cl.
H04N 1/04 (2006.01)

(52) U.S. Cl.
CPC ....................................... H04N 1/04 (2013.01)

(58) Field of Classification Search
USPC .......................................... 358/505, 515, 518
See application file for complete search history.

(56) References Cited

U.S. PATENT DOCUMENTS

| 5,828,026 | A | 10/1998 | Bruhl et al. |
|---|---|---|---|
| 6,240,203 | B1 | 5/2001 | Kawano et al. |
| 7,308,137 | B2 | 12/2007 | Hsieh et al. |
| 7,319,786 | B2 | 1/2008 | Hirota et al. |
| 7,359,100 | B2 | 4/2008 | Shimizu |
| 7,466,455 | B2 | 12/2008 | Boesten et al. |
| 7,778,460 | B2 | 8/2010 | Park et al. |
| 7,999,966 | B2 | 8/2011 | Fritz et al. |
| 2006/0181725 | A1* | 8/2006 | Matsuya .................. 358/1.9 |
| 2006/0209357 | A1* | 9/2006 | Nishimura et al. ........... 358/448 |
| 2009/0009830 | A1 | 1/2009 | Saito |
| 2009/0190193 | A1* | 7/2009 | Sato .............................. 358/505 |
| 2009/0225378 | A1* | 9/2009 | Minamino .................... 358/513 |

FOREIGN PATENT DOCUMENTS

| JP | 2001-036752 A | 2/2001 |
|---|---|---|
| JP | 2008-103917 A | 5/2008 |
| JP | 2009-260640 | 11/2009 |
| JP | 2009260640 A | * 11/2009 |
| JP | 2010-011309 A | 1/2010 |

* cited by examiner

Primary Examiner — Steven Kau
Assistant Examiner — Andrew H Lam
(74) Attorney, Agent, or Firm — Fitzpatrick, Cella, Harper & Scinto

(57) ABSTRACT

Erroneous determination of an image caused by color shift is prevented. Image data is divided in a sub-scanning direction into a first region where color shift hardly occurs and a second region where color shift easily occurs. There are detected a first color line drawing extending in a main-scanning direction in the first region, a second color line drawing extending in the main-scanning direction and having a width larger than that of the first color line drawing in the second region, and a third color line drawing extending in the sub-scanning direction in the image data. On the basis of the detected first, second, and third color line drawings, it is determined whether a document is a color document or not.

4 Claims, 28 Drawing Sheets

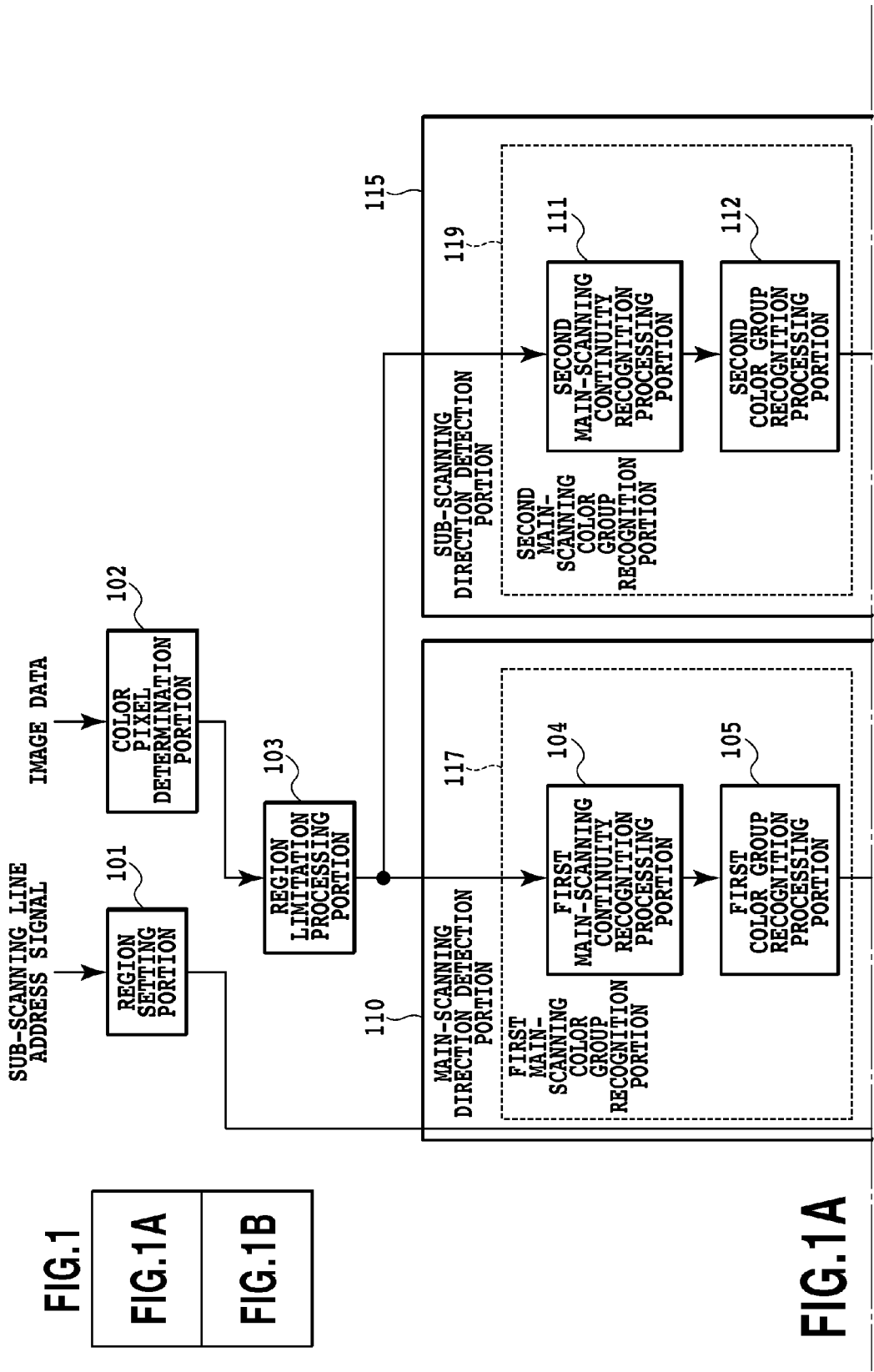

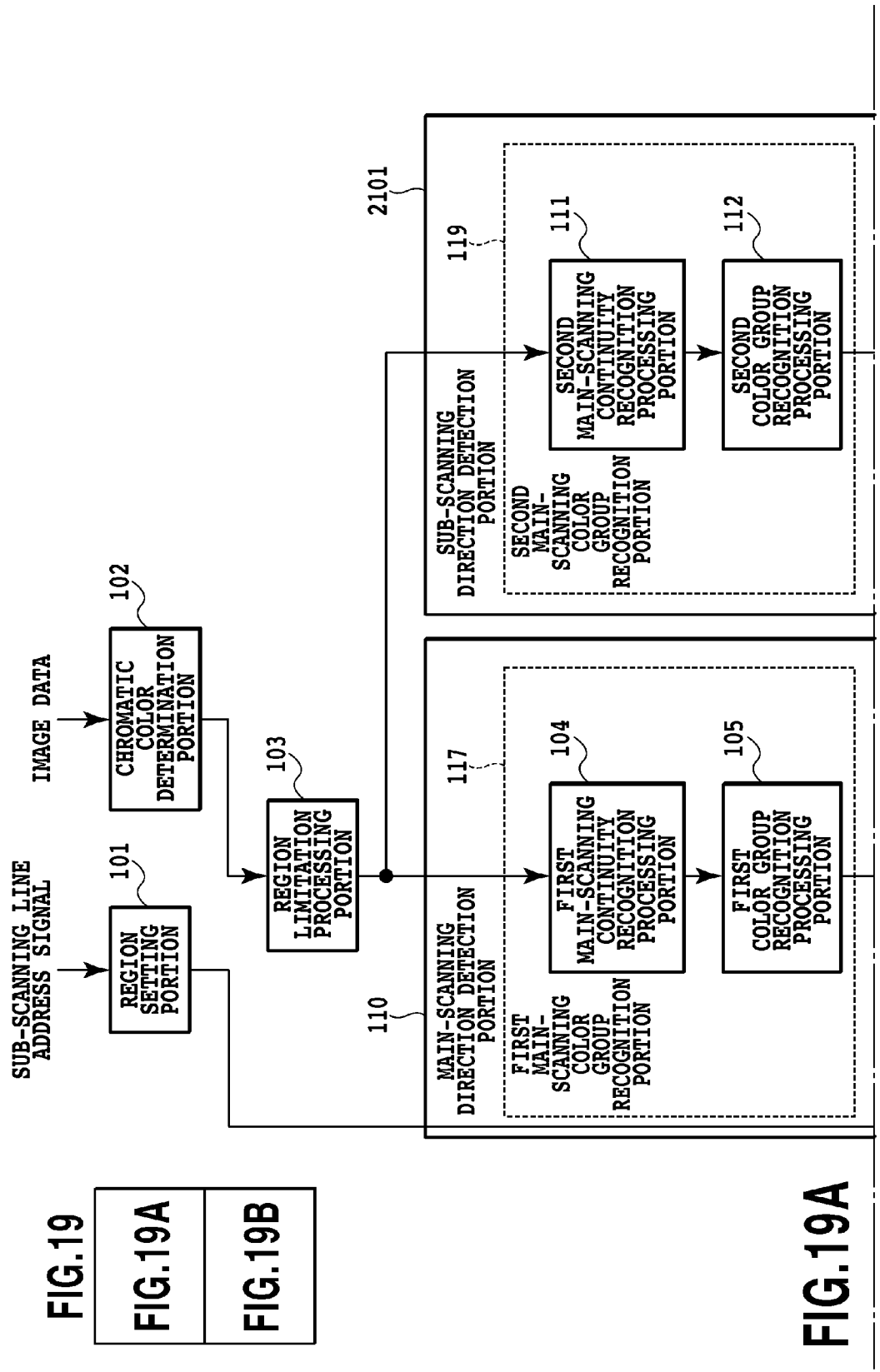

| SUB-SCANNING CONTINUITY RECOGNITION PROCESSING PORTION | CONTROL SIGNAL | | | |
|---|---|---|---|---|
| | 00 | 01 | 10 | 11 |
| SIXTH | NOT RESET AT BOUNDARY | RESET AT BOUNDARY | NOT RESET AT BOUNDARY | RESET AT BOUNDARY |
| SEVENTH | | | | |
| EIGHTH | NOT RESET AT BOUNDARY | NOT RESET AT BOUNDARY | RESET AT BOUNDARY | RESET AT BOUNDARY |
| NINTH | | | | |

FIG.24

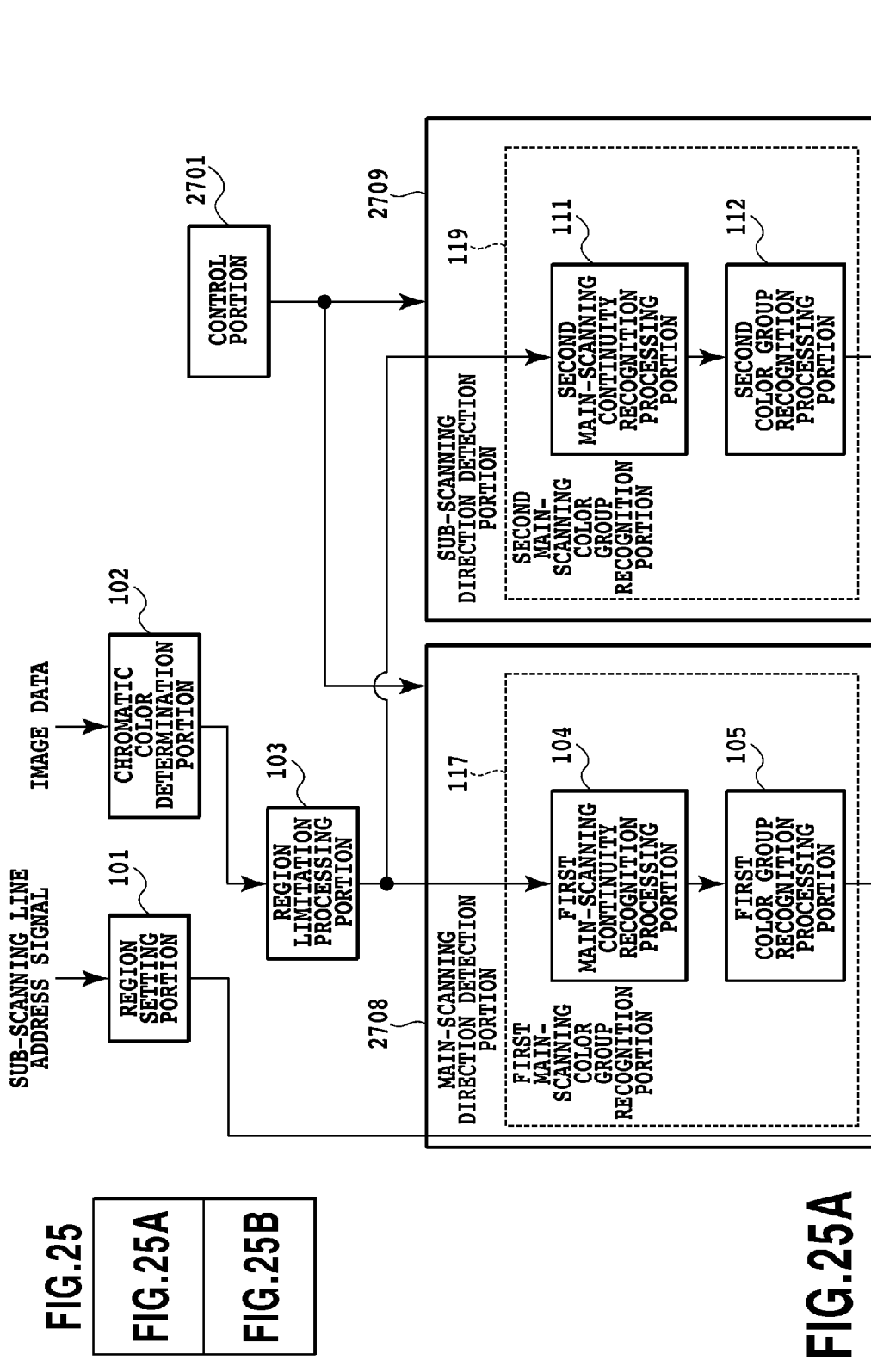

DETERMINING WHETHER AN IMAGE IS COLOR

This application is a divisional of U.S. patent application Ser. No. 13/019,909, filed Feb. 2, 2011, the contents of which are incorporated by reference herein.

BACKGROUND OF THE INVENTION

1. Field of the Invention

The present invention relates to an image determining apparatus and an image determining method that determine whether image data read from a document by a reading device is a color image or a monochrome image.

2. Description of the Related Art

A color copier has a function of ACS (Auto Color Select). This is a function to determine if a document to be copied is in color or monochrome. However, the ACS function might fail in determination. Particularly when a monochrome document is erroneously determined as a color document, the cause of the erroneous determination may include a phenomenon called color shift. Though a monochrome document was read, a color component caused by the color shift is mixed in the image data of a reading result, and thereby the determination fails. The reason why the phenomenon of color shift occurs will be described below.

An imaging sensor mounted on a color copier typically comprises three line sensors for R, G and B that divide reflected light from a color document into R (red), G (green) and B (blue) to read each color component.

For the purpose of the above-described spectroscopy, a spectroscopic filter is typically installed on each line sensor. These line sensors have physical clearances between each color. Thus, the image read at the same time is read at different positions on the document by a distance corresponding to the above-described clearance. Therefore, in order to form final color image data from image data read by each line sensor, it is only necessary to make position correction for the above-described clearance.

However, if an uneven scanning speed in reading the document or an accidental shock during the scanning due to an external cause occurs, the RGB lines, which should intrinsically form an image, cannot appropriately form an image, and the phenomenon of color shift occurs.

If the color shift occurs at an image edge portion of a monochrome document, though R and G are low brightness signals exhibiting black, for example, B forms a line with high brightness exhibiting white. If they are formed into an image, blue data (fake color) is generated on the data intrinsically having only monochrome information.

The fact that a color component is mixed in the monochrome document due to the phenomenon called color shift was described. If the color component is included, the ACS function may erroneously determine a monochrome document as a color document. Japanese Patent Laid-Open No. 2009-260640 solves this determination problem using three technologies.

The first technology determines the pixel as monochrome even if a target pixel has some color components. This technology provides a first threshold value, and if the maximum color difference of the target pixel is smaller than the first threshold value, the pixel is determined as monochrome.

The second technology determines the read-out document as a monochrome document if the number of color pixels to the entire read-out image data is small. This technology provides a second threshold value, and if the number of color pixels is smaller than the second threshold value, the read-out document is determined as a monochrome document.

The third technology lowers sensitivity of color determination for a part of a region in a document. This technology provides a third threshold value, and if the number of color pixels in the region is smaller than the third threshold value, the region is determined as monochrome. This technology determines all the regions in the document, respectively, and finally determines the document as a color document or a monochrome document.

Here, the part of the region refers to a region where the color shift becomes particularly large. In an apparatus that feeds a document using an automatic document feeder or the like and reads the document, for example, the document collides against various members on a feeding path. The various members include a feeding roller, a guide plate and the like. If the document collides against such members, an image forming relationship of the respective RGB line sensors is largely shifted due to the above-described accidental shock, and whereby the color component is generated.

The Japanese Patent Laid-Open No. 2009-260640, for the region where the color shift due to an accidental shock as above occurs, determines a monochrome document as monochrome using the above-described third technology.

However, a color image on a document, which is desired to be actually determined as a color document by the ACS, is an image in which color pixels are continuously lumped to some degrees such as a character, for example. The Japanese Patent Laid-Open No. 2009-260640 sets the threshold value larger for the region with large color shift and determines a monochrome document with the color shift as monochrome on the basis of whether the number of counted color pixels exceeds the pixel number or not. This method cannot discriminate the color component generated by the color shift from the color component of a color image. Thus, even if a color image which should be intrinsically detected is present in a region with large color shift, if the number of color pixels is small, it is likely that the document is not determined as a color document.

SUMMARY OF THE INVENTION

The present invention has an object to provide an image determining apparatus and an image determining method that do not make an erroneous determination by a fake color generated by color shift.

The image determining apparatus according to the present invention includes: a unit configured to divide image data read out of a document in a sub-scanning direction into a first region where color shift hardly occurs and a second region where color shift easily occurs; a unit configured to detect a first color line drawing having a predetermined length and width and extending in a main-scanning direction in the first region; a unit configured to detect a second color line drawing having a predetermined length and a width larger than that of the first color line drawing and extending in the main-scanning direction in the second region; a unit configured to detect a third color line drawing having a predetermined length and width and extending in the sub-scanning direction in the image data; and a unit configured to determine whether or not the document is a color document on the basis of the number of the first, second, and third color line drawings.

According to the present invention, an image determining apparatus and an image determining method that do not make an erroneous determination by a fake color generated in color shift.

Further features of the present invention will become apparent from the following description of exemplary embodiments (with reference to the attached drawings).

BRIEF DESCRIPTION OF THE DRAWING

FIG. 1 is a diagram showing the relationship between FIGS. 1A and 1B;

FIGS. 1A and 1B are block diagrams illustrating a configuration of an image determining apparatus;

FIG. 19 is a diagram showing the relationship between FIGS. 19A and 19B;

FIGS. 19A and 19B are block diagrams of an image determining apparatus in a second embodiment;

FIG. 24 is a table illustrating an operation of a control signal and the sub-scanning continuity recognition processing portion;

FIG. 25 is a diagram showing the relationship between FIGS. 25A and 25B; and

FIGS. 25A and 25B are block diagrams of an image determining apparatus in a third embodiment.

DESCRIPTION OF THE EMBODIMENTS

Figure 1B:
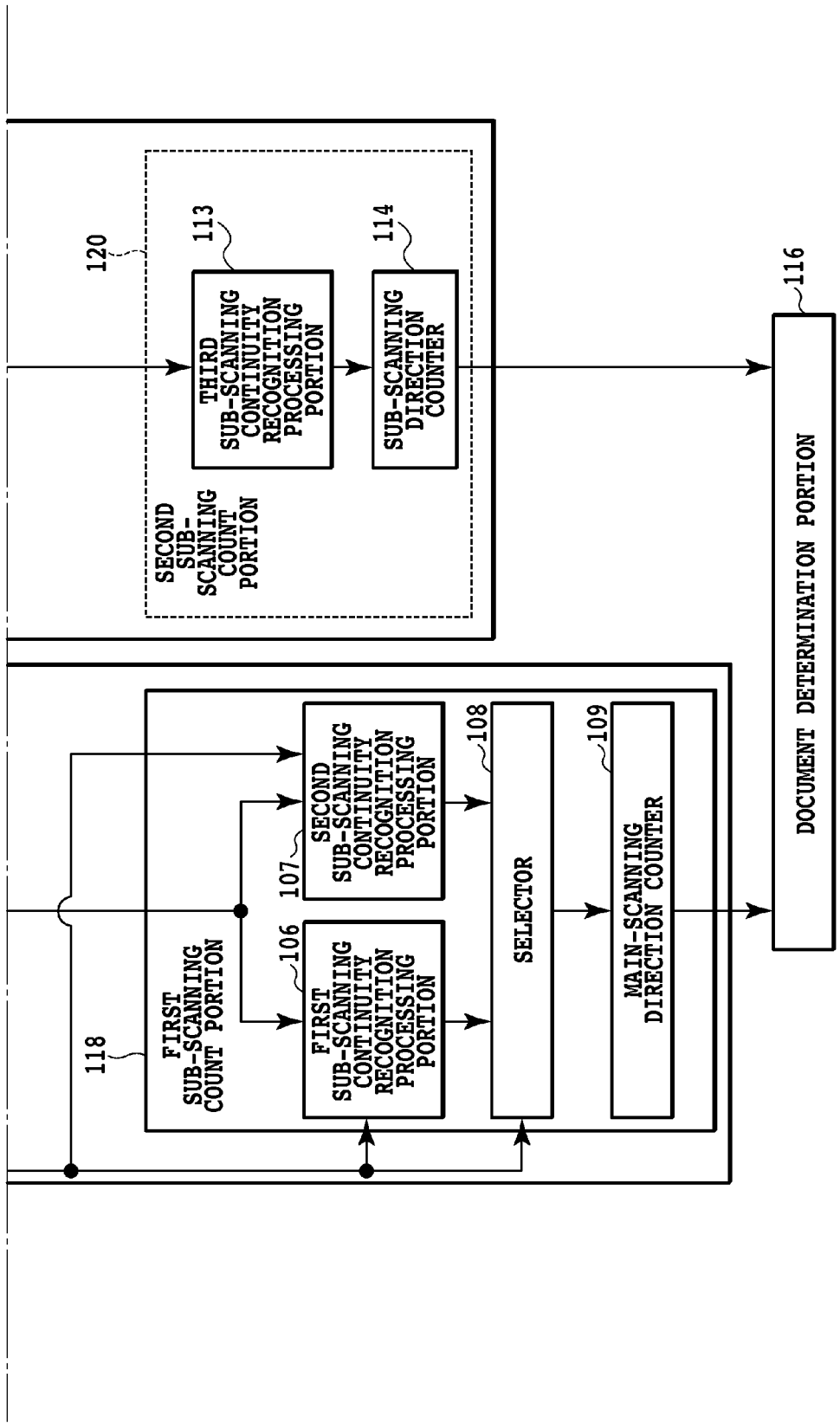

Embodiments of the present invention will be described below in more detail referring to the attached drawings.

First Embodiment

As described above, the prior-art technology that counts the number of color pixels and increases a threshold value of color determination in a region with large color shift, cannot discriminate whether the color pixels continue or not. As a result, even if a color image which should be intrinsically detected is present in the region with large color shift, if the number of color pixels is small, it is likely that the document is not determined as a color document.

Then, the present invention, first, determines if a color line extending in the main-scanning direction is present in read-out image data or not. If the color line extending in the main-scanning direction is present as the result of determination, the document is determined as color.

Further, it is determined at the same time if a color line extending in the sub-scanning direction is present in the read-out image data. If the color line extending in the sub-scanning direction is present as the result of determination, the document is determined as color.

However, with this method only, in the region with large color shift, there remains a possibility that a monochrome document is erroneously determined as a color document. Since several color lines extending in the main-scanning direction appear in an edge portion of the monochrome line extending in the main-scanning direction due to the color shift, the document is erroneously determined as a color document. Since the monochrome line extending in the sub-scanning direction has a small influence amount caused by color shift for the length in the sub-scanning direction, it does not result in erroneously determination.

Then, in this embodiment, read-out image data is divided into a region with large color shift and the other regions, and a threshold value for determination of continuity in the sub-scanning direction is set at a value suitable for each region for a color line extending in the main-scanning direction (performed by a first sub-scanning count portion 118, which will be described later). As a result, in the region with large color shift, even if a color line extending in the main-scanning direction appears in an edge portion of a monochrome line extending in the main-scanning direction due to color shift, the document can be determined as a monochrome document. On the other hand, the color line extending in the main-scanning direction that should be intrinsically detected is generally thicker than the color line caused by color shift. Thus, the document can be determined as a color document by detecting the color line other than those caused by color shift in the image data.

A detailed embodiment will be described below using the attached drawings.

Further, for convenience of description, resolution of a reading device is assumed to be 600 dpi (dot per inch) for main-scanning and 600 dpi for sub-scanning.

[Description of Color Shift]

In a color copier, if a document is read by a line sensor and an automatic document feeder, it is ideal that the document is fully fed at a constant speed, and the image data formed at this time is the most faithful to the document. However, due to steady unevenness in document feeding or a shock occurring on the feeding path, the phenomenon called color shift occurs.

Figure 2A:
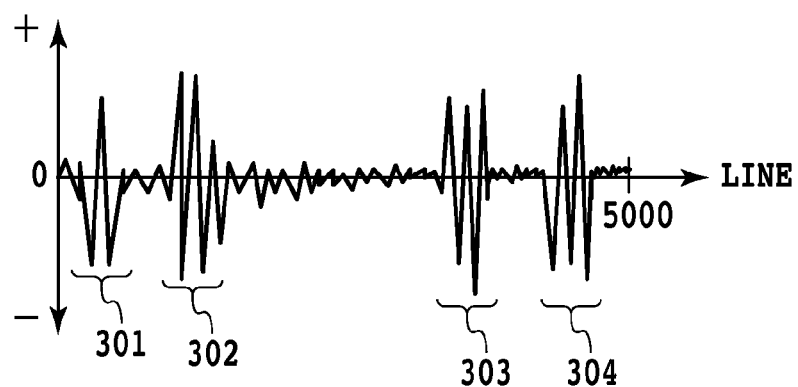
FIGS. 2A and 2B are diagrams illustrating a state of color shift in the form of a graph.

FIG. 2A is a diagram illustrating a state of color shift when a document with a sub-scanning length of 5000 lines is read in the form of a graph. Portions with reference numerals 301, 302, 303 and 304 indicate that the color shift is large. When a distal end of the document collides against a guide of the automatic document feeder, an influence of a shock of the collision appears in the form of color shift in image data at the read position at that time. Similarly, reference numeral 302 indicates the color shift when the document distal end reaches a paper ejection roller. Subsequently, reference numeral 303 indicates the color shift caused by the shock when the document rear end exits a paper supply roller. Then, reference numeral 304 indicates the color shift caused by the shock when the document rear end exits the feeding roller.

Figure 2B:

FIG. 2B is a diagram illustrating a state of color shift when a document with a sub-scanning length of 7000 lines is read in the form of a graph. Portions with reference numerals 305, 306, 307 and 308 indicate that the color shift is large. Reference numeral 305 indicates the color shift by the document distal end and the guide, and reference numeral 306 indicates the color shift by the document distal end and the paper ejection roller. Further, reference numeral 307 indicates the color shift by the document rear end and the paper supply roller and reference numeral 308 indicates the color shift by the document rear end and the feeding roller.

As described above, in a color copier, the position of the color shift caused by steady unevenness of document feeding or a shock occurring on the feeding path is determined by the configuration of the document feeder and the sub-scanning length of the document. Such color shift can be classified into those caused by a shock in the document distal end portion and those caused by a shock in the document rear end portion. Therefore, by grasping the position of the occurrence of steady unevenness of document feeding or a shock occurring on the feeding path, a position where the color shift can easily occur can be specified in advance.

What influence is given on the read-out image data by color shift will be described.

Figure 3A:
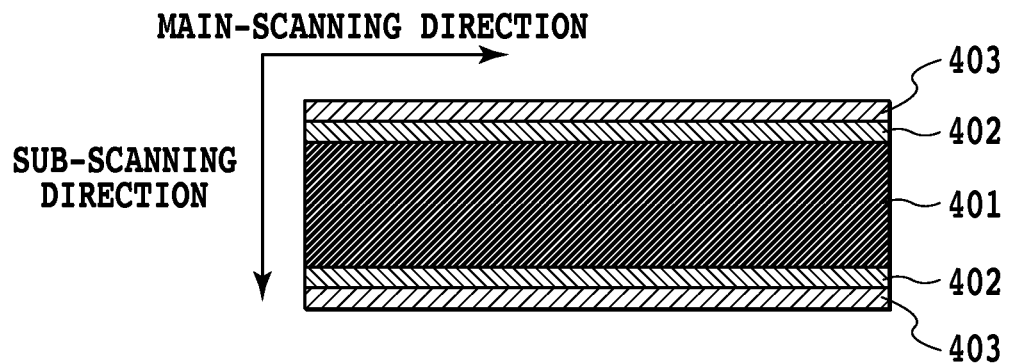
FIGS. 3A and 3B are diagrams illustrating an influence of the color shift on image data.

FIG. 3A shows image data when a black line in the main-scanning direction is read. Fluctuation caused by color shift has occurred to a position correction amount for forming an image from data in each color of the line sensors. Thus, fake colors 402 and 403 caused by color shift are generated in an edge portion in the sub-scanning direction of black image data 401. If the color shift is large, a region where the fake color is present becomes large in the sub-scanning direction. In this example, two lines are affected by the fake colors caused by the color shift.

Figure 3B:
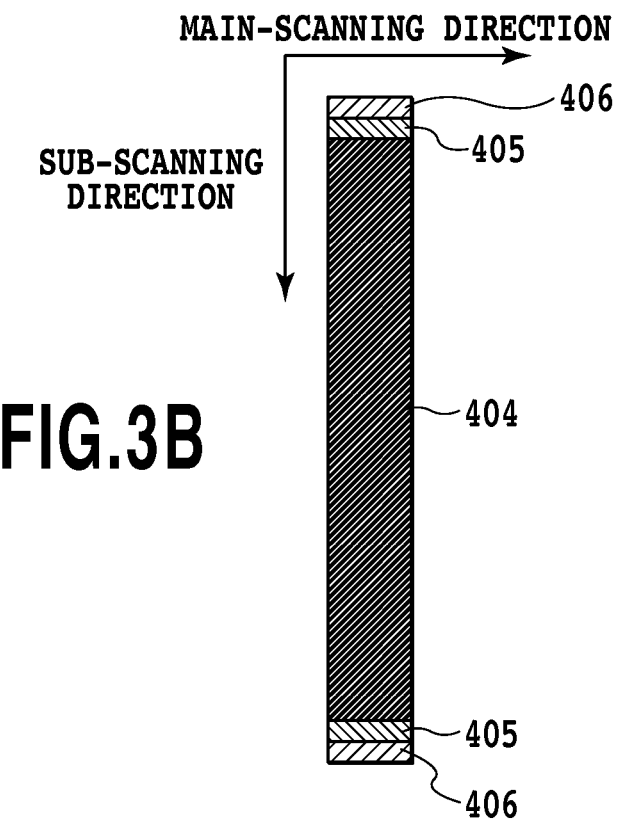

FIG. 3B shows image data when a black line in the sub-scanning direction is read. Fake colors 405 and 406 caused by color shift are generated in the edge portion in the sub-scanning direction of black image data 404.

[Configuration of Image Determining Apparatus]

FIGS. 1A and 1B are block diagrams illustrating a configuration of the image determining apparatus that realizes the ACS function in the first embodiment.

A region setting portion 101 divides image data in the sub-scanning direction into a region (first region) where color shift hardly occurs and a region (second region) where color shift easily occurs and holds position information of the regions. The division of the image data by the region setting portion 101 is made, considering steady unevenness of document feeding, a position where a shock on the feeding path can easily occur and the like. The region setting portion 101 inputs a sub-scanning line address signal of the image data and indicates which region the target line is. A color pixel determination portion 102 inputs image data read by the document reader and determines if it is color or not for each pixel. A region limitation processing portion 103 sets a region where the ACS function is invalidated for the entire image data. After the processing by the region limitation processing portion 103, processing is roughly divided into the processing by a main-scanning direction detection portion 110 and the processing by a sub-scanning direction detection portion 115.

Figure 5:
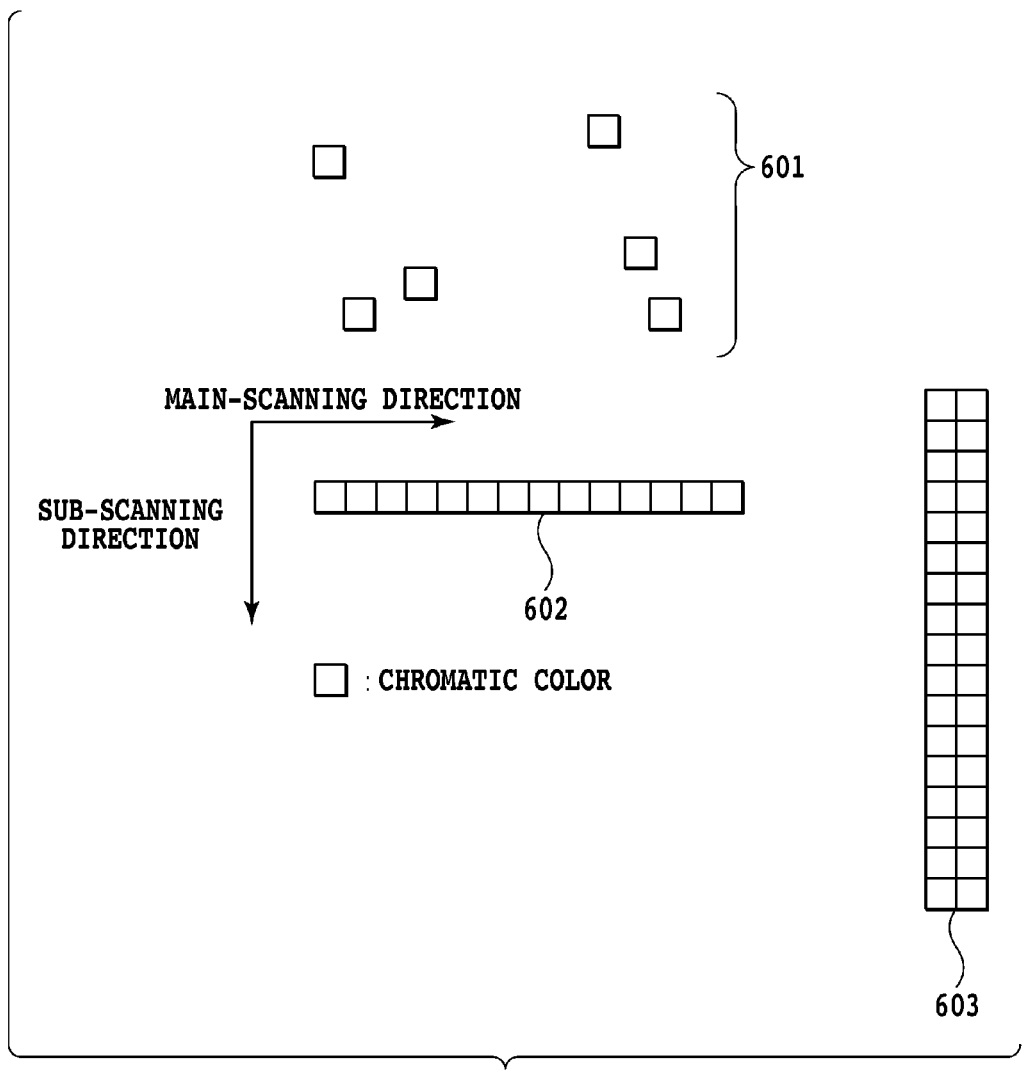
FIG. 5 is a diagram illustrating an example of a color pixel in image data.

The main-scanning direction detection portion 110 is a block that mainly detects a color line drawing and the like extending in the main-scanning direction on the document as reference numeral 602 in FIG. 5. The sub-scanning direction detection portion 115 is a block that mainly detects a color line drawing and the like extending in the sub-scanning direction on the document as reference numeral 603 in FIG. 5. A color line drawing extending diagonally on the document is detected by the sub-scanning direction detection portion 115 as will be described later. The main-scanning direction detection portion 110 and the sub-scanning direction detection portion 115 execute processing in parallel, respectively. Then, according to a result of the color image detected by each of them, the document determination portion 116 determines if the document to be processed is a color document or a monochrome document.

The main-scanning direction detection portion 110 is provided with a first main-scanning color group recognition portion 117 and a first sub-scanning count portion 118. The first main-scanning color group recognition portion 117 is provided with a first main-scanning continuity recognition processing portion 104 and a first color group recognition processing portion 105.

If color pixels are continuously present on the same line in the main-scanning direction, the first main-scanning continuity recognition processing portion 104 counts the continuity and detects the color pixels continuously present in the main-scanning direction as a lump of color. The first color group recognition processing portion 105 determines if the line is a color line or not by counting the lumps of color present on the same line.

The first sub-scanning count portion 118 is provided with a first sub-scanning continuity recognition processing portion 106, a second sub-scanning continuity recognition processing portion 107, a selector 108, and a main-scanning direction counter 109.

The first sub-scanning continuity recognition processing portion 106 detects a lump of color in the sub-scanning directions in a region where color shift is not large by counting continuity if color lines are continuously present in the sub-scanning direction. Further, the first sub-scanning continuity recognition processing portion 106 controls a reset operation of a counter by referring to the setting of the region setting portion 101. The second sub-scanning continuity recognition processing portion 107 executes the processing similar to the first sub-scanning continuity recognition processing portion. A difference is that the second sub-scanning continuity recognition processing portion 107 executes processing using a threshold value different from that of the first sub-scanning continuity recognition processing portion 106 in order to detect a lump of color in the sub-scanning direction in a region where color shift is large. The selector 108 selects a result of the first sub-scanning continuity recognition processing portion 106 or the second sub-scanning continuity recognition processing portion 107 for each region by referring to the setting of the region setting portion 101. The main-scanning direction counter 109 counts the total number of the lumps of color detected in the main-scanning direction detection portion 110.

The sub-scanning direction detection portion 115 is provided with a second main-scanning color group recognition portion 119 and a second sub-scanning count portion 120. A part of constituent element provided in these blocks has the function similar to the constituent elements provided in the main-scanning direction detection portion 110. The sub-scanning direction detection portion 115 operates using a threshold value for detecting a color line drawing extending in the sub-scanning direction. An image to be processed by the sub-scanning direction detection portion 115 might be different from that of the main-scanning direction detection portion 110.

The second main-scanning color group recognition portion 119 is provided with a second main-scanning continuity recognition processing portion 111 and a second color group recognition processing portion 112.

The second main-scanning continuity recognition processing portion 111 has the same function as the first main-scanning continuity recognition processing portion 104, and the second main-scanning continuity recognition processing portion 111 operates with a threshold value for detecting a color line drawing extending in the sub-scanning direction. The second color group recognition processing portion 112 has the same function as the first color group recognition processing portion 105, and the second color group recognition processing portion 112 operates with a threshold value for detecting a color line drawing extending in the sub-scanning direction.

The second sub-scanning count portion 120 is provided with a third sub-scanning continuity recognition processing portion 113 and a sub-scanning direction counter 114.

The third sub-scanning continuity recognition processing portion 113 detects a lump of color by counting continuity if color lines are continuously present in the sub-scanning direction. The sub-scanning direction counter 114 counts the total number of lumps of color detected in the third sub-scanning continuity recognition processing portion 113.

[Operation of Image Determining Apparatus]

An operation of the image determining apparatus will be described below in detail.

Figure 7:
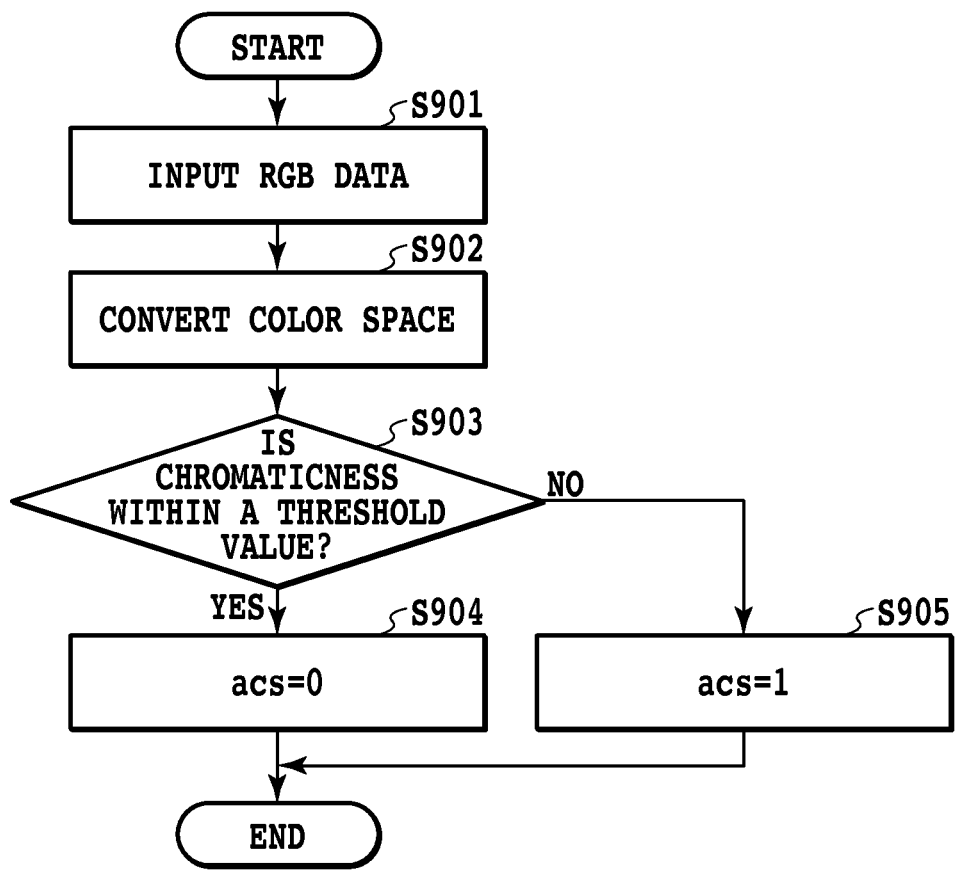
FIG. 7 is a flowchart illustrating a flow of processing of a region limitation processing portion.

FIG. 7 is a flowchart illustrating an operation of the color pixel determination portion 102. The color pixel determination portion 102 inputs image data composed of an RGB signal read by the reading device (Step S901).

For all the pixels, color-space conversion is performed into an L*a*b* uniform color space defined by CIE (International Commission on Illumination), for example (Step S902).

Figure 6:
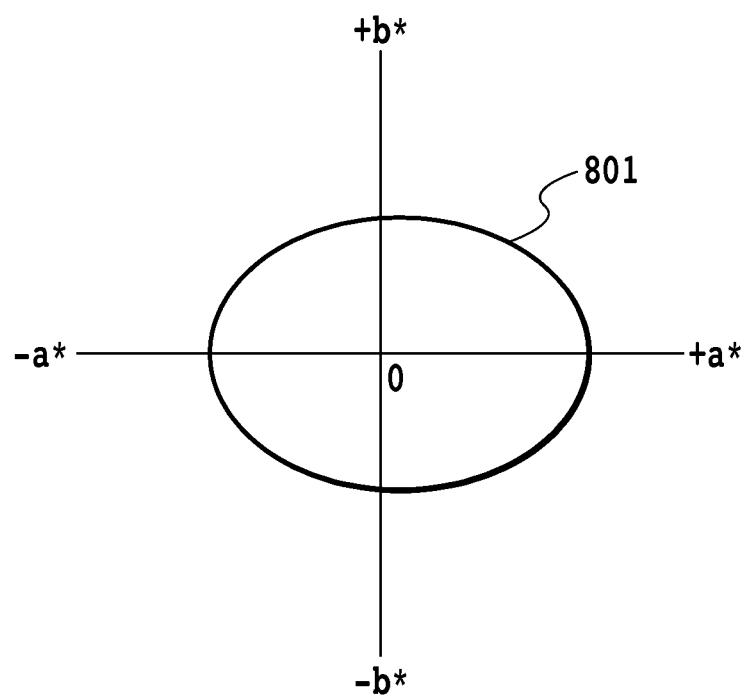
FIG. 6 is a diagram for explaining the color pixel determination.

FIG. 6 illustrates an a*-b* plane. A space where a* and b* both become 0, that is, a space on an L* axis is fully monochrome. A threshold value 801 of chromaticness is provided around the L* axis. The color pixel determination portion 102 determines whether a coordinate indicated by a* and b* of a target pixel is inside or outside the threshold value 801 (Step S903). That is, the color pixel determination portion 102 determines whether the target pixel is color or monochrome.

Figure 4A:
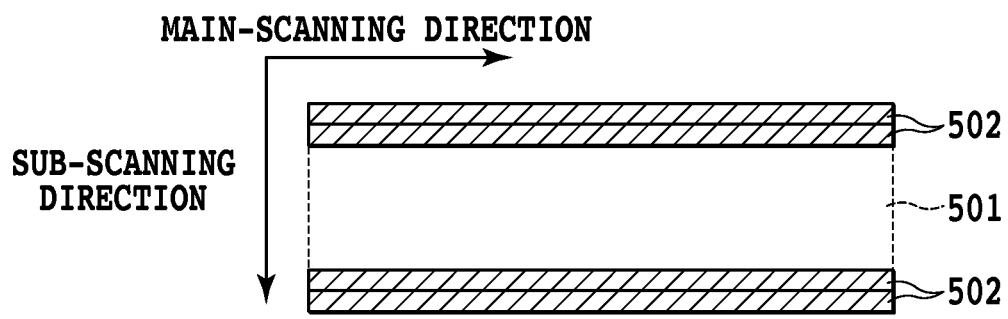
FIGS. 4A and 4B are diagrams illustrating an example of a result of color pixel determination.
Figure 4B:
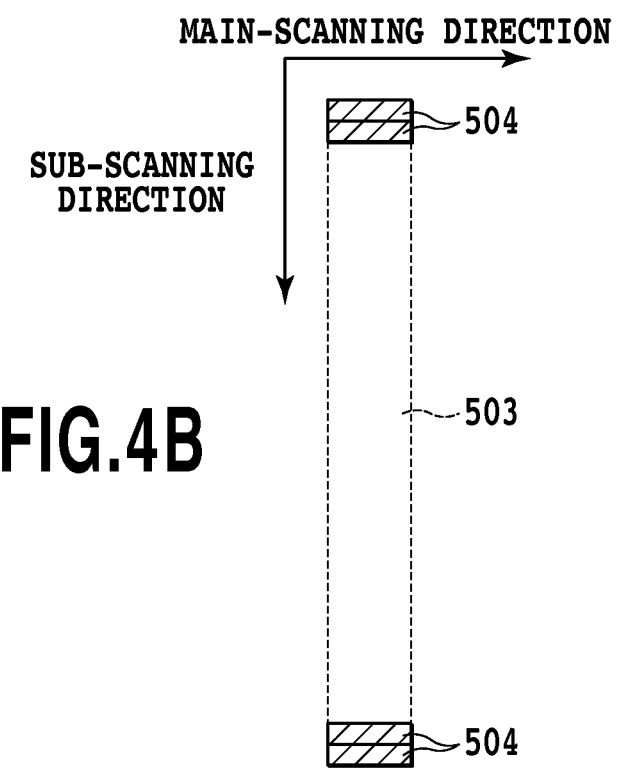

Reference numeral 502 in FIG. 4A and reference numeral 504 in FIG. 4B indicate portions to be determined as color when color/monochrome determination is made for the images in FIGS. 3A and 3B.

If it is determined that the value is within the threshold value at Step S903, since the pixel is monochrome, a flag indicating monochrome is added to the target pixel. For example, acs, which is a color/monochrome signal, is added as acs=0 (Step S904).

If it is determined that the value is outside the threshold value at Step S903, since the pixel is color, a flag indicating color is added to the target pixel. For example, acs, which is a color/monochrome signal, is added as acs=1 (Step S905). By counting in the subsequent step the color/monochrome flags added to each pixel of input image as above, the ACS function is performed.

In order to obtain image information described on the document, vicinities of the distal end, the rear end, the right end, and the left end of the document might be read. At this time, a color component might be generated in a document edge at each end portion. Since it is noise information to the ACS function, it is eliminated in the region limitation processing portion 103 in advance.

Figure 8:
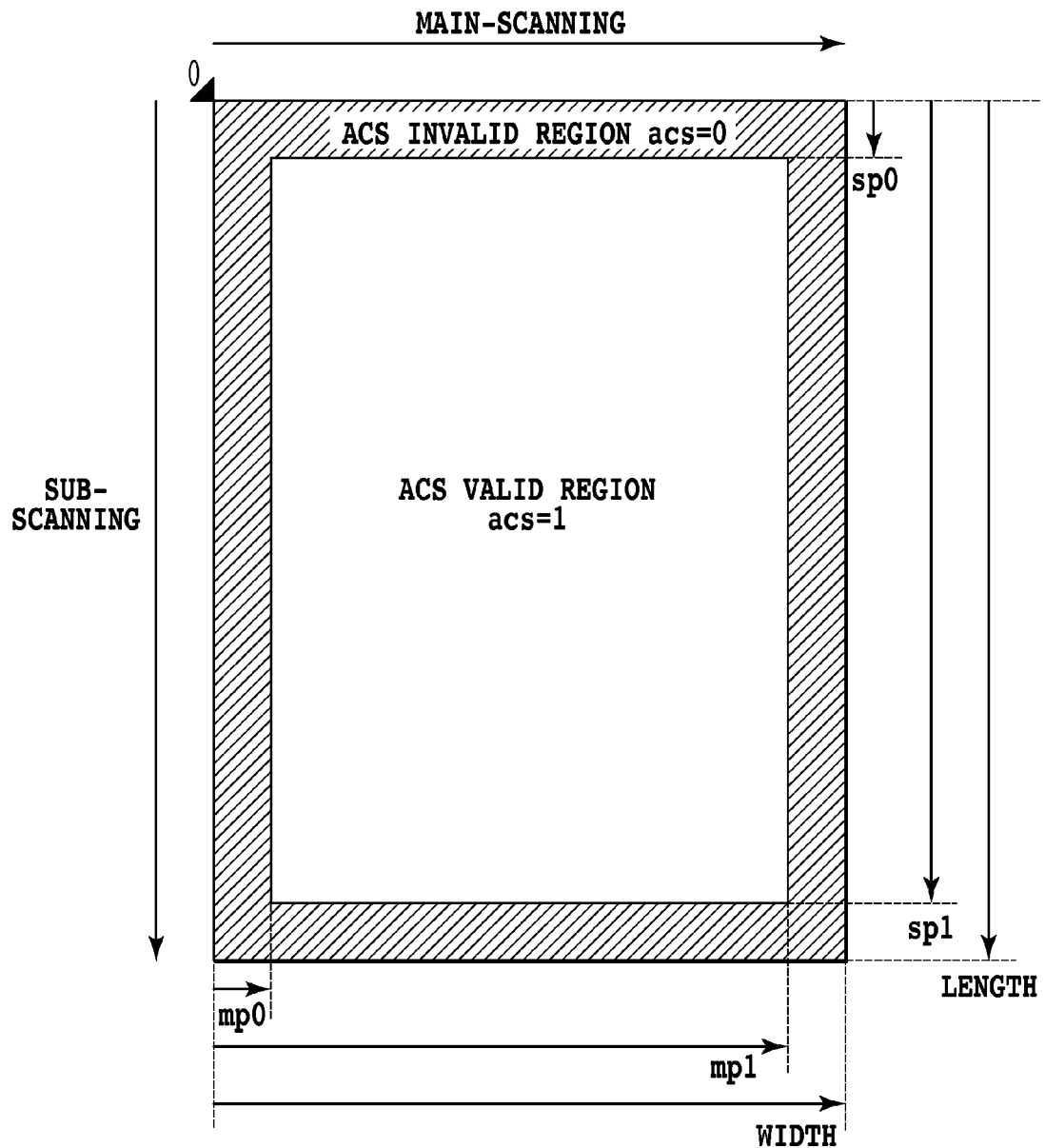
FIG. 8 is a diagram for explaining a result of region limitation.

FIG. 8 is a diagram illustrating a region limited by the region limitation processing portion 103.

Supposing that the width of the document is "width", mp0, mp1, and width are set from the origin side in the main-scanning direction. In addition, supposing that the length of the document is "length", sp0, sp1, and length are set from the origin side in the sub-scanning direction. By means of these coordinate designations, the document region can be divided into an ACS valid region and an ACS invalid region shown in the figure. As for an acs signal generated in the color determination portion 102, the above-described noise information can be eliminated by forcedly masking a pixel in the ACS invalid region to acs=0.

Figure 9:
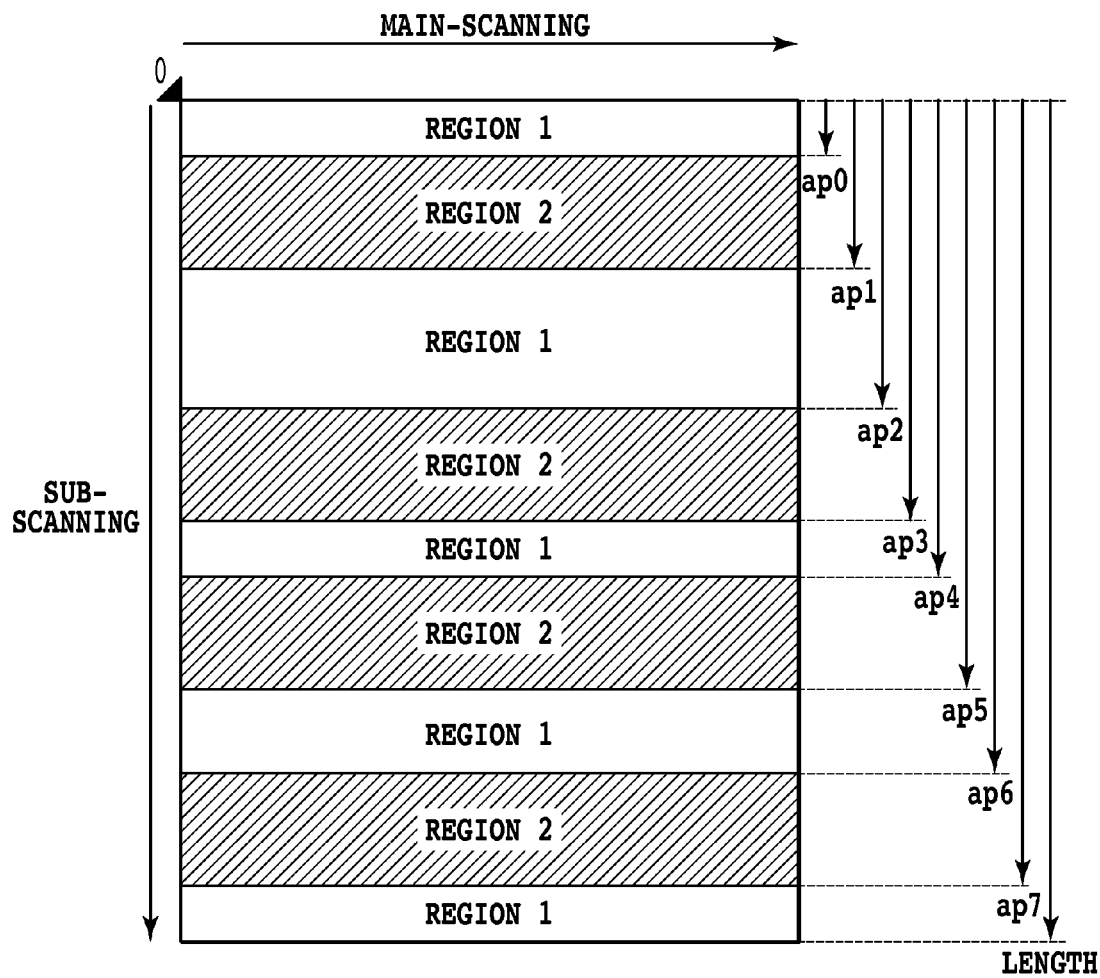
FIG. 9 is a diagram for explaining region setting.

FIG. 9 is a diagram illustrating a region set by the region setting portion 101.

Supposing that the length of the document is "length", ap0, ap1, ap2, ap3, ap4, ap5, ap6, ap7, and length are set. By means of these coordinate designations, a plurality of regions 1 and a plurality of regions 2 are divided. Here, the region 1 is a region with small color shift, while the region 2 is a region with large color shift. The region 2 is set so as to include the regions 301, 302, 303, 304, 305, 306, 307 and 308 with large color shift shown in FIGS. 2A and 2B.

Subsequently, the main-scanning direction detection portion 110 will be described in detail.

Figure 10:
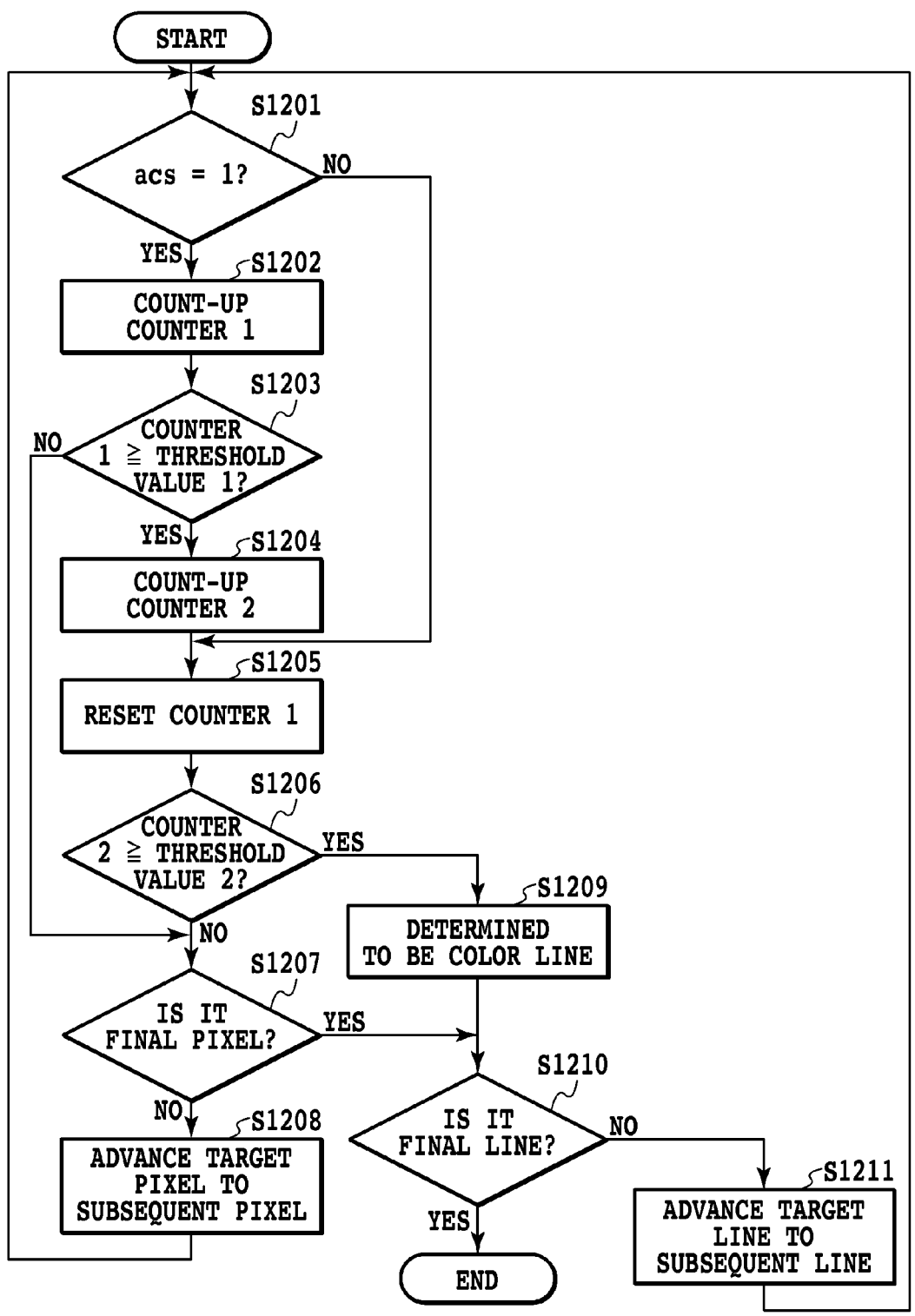
FIG. 10 is a flowchart illustrating a flow of processing of a first main-scanning color group recognition portion.

FIG. 10 is a flowchart illustrating an operation to determine whether a target line is a color line or not by the first main-scanning continuity recognition processing portion 104 and the first color group recognition processing portion 105.

If the acs signal corresponding to the target pixel of the target line is inputted, the first main-scanning continuity recognition processing portion 104 determines if the target pixel is color or not (Step S1201).

If the target pixel is color, a counter 1 of the first main-scanning continuity recognition processing portion 104 is counted up (Step S1202). The counter 1 is a counter for counting continuity of continuous color pixels.

Subsequently, the first main-scanning continuity recognition processing portion 104 determines if a count value of the counter 1 has reached the threshold value 1 set in advance or not (Step S1203). The threshold value 1 is a threshold value to determine a color pixel group continuously present on the same line as a lump of color or not.

If the count value of the counter 1 has reached the threshold value 1 (that is, a lump of color is detected), a counter 2 of the first color group recognition processing portion 105 is counted up (Step S1204). The counter 2 is a counter for counting the number of lumps of color.

The counter 1 is reset in order to search a lump of color again (Step S1205). Further, if the target pixel is determined to be monochrome at Step S1201, too, the counter 1 is reset at Step S1205. This means that continuity of the color pixels is discontinued.

Subsequently, the first color group recognition processing portion 105 determines if the count value of the counter 2 has reached the threshold value 2 set in advance or not (Step S1206). The threshold value 2 is a threshold value to determine if the target line is determined to be a color line or not. Therefore, if the count value of the counter 2 has reached the threshold value 2, the first color group recognition processing portion 105 determines that this target line is a color line (Step S1209).

The first color group recognition processing portion 105 determines if the target line is the final line in the document or not (Step S1210).

If it is the final line, operations of the first main-scanning continuity recognition processing portion 104 and the first color group recognition processing portion 105 are finished.

If it is not the final line, the target line is advanced by one line, and the routine returns to Step S1201 (Step S1211).

If the count value of the counter 2 has not reached the threshold value 2 at Step 1206, the first color group recognition processing portion 105 determines if the target pixel is the final pixel of the target line or not (Step S1207). If the count value of the counter 1 has not reached the threshold value 1 at S1203, too, it is determined if the target pixel is the final pixel or not at Step S1207.

If it is determined that the pixel is the final pixel at Step S1207, the routine goes to Step S1210. If it is determined that the pixel is not the final pixel, the target pixel is advanced by one pixel, and the routine returns to Step S1201.

As described above, according to the processing shown in FIG. 10, it can be determined if the target line is a color line or not.

Figure 11:
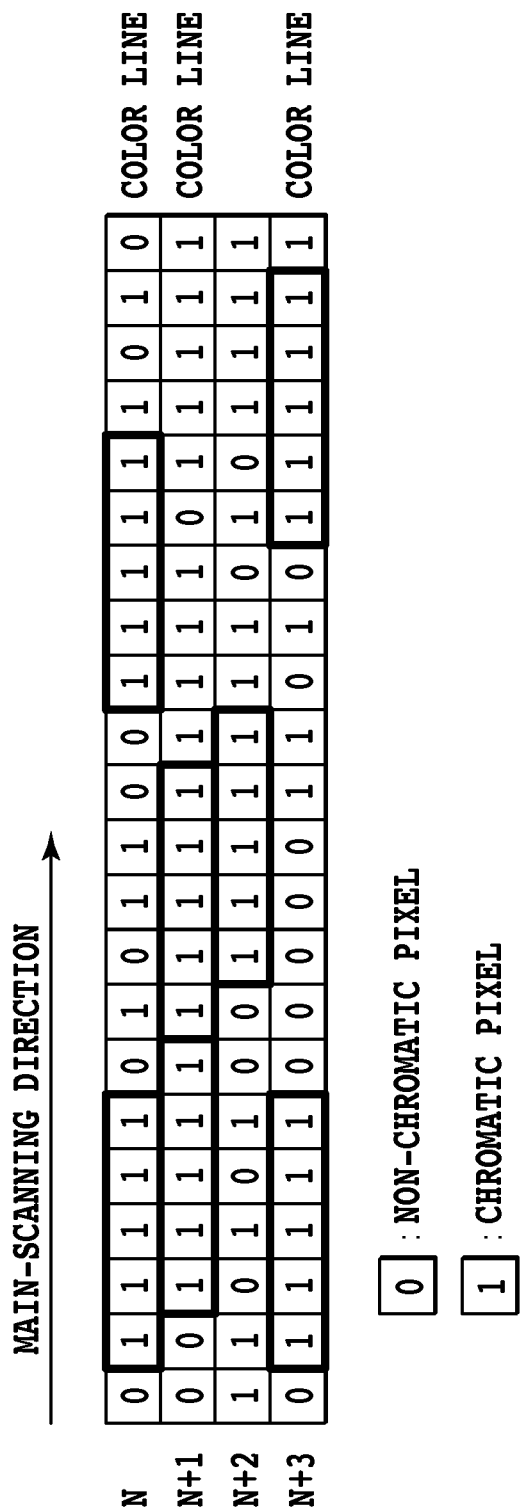
FIG. 11 is a diagram for explaining an operation result of the first main-scanning color group recognition portion.

FIG. 11 shows an example when the threshold value 1=5 and the threshold value 2=2. It is known that as a result of detection of a lump of continuous five pixels in the main-scanning direction by the first main-scanning continuity recognition processing portion 104 and detection of the fact that there are two or more lumps by the first color group recognition processing portion 105, they are determined that an N line, an N+1 line, and an N+3 line are color lines.

Figure 12:
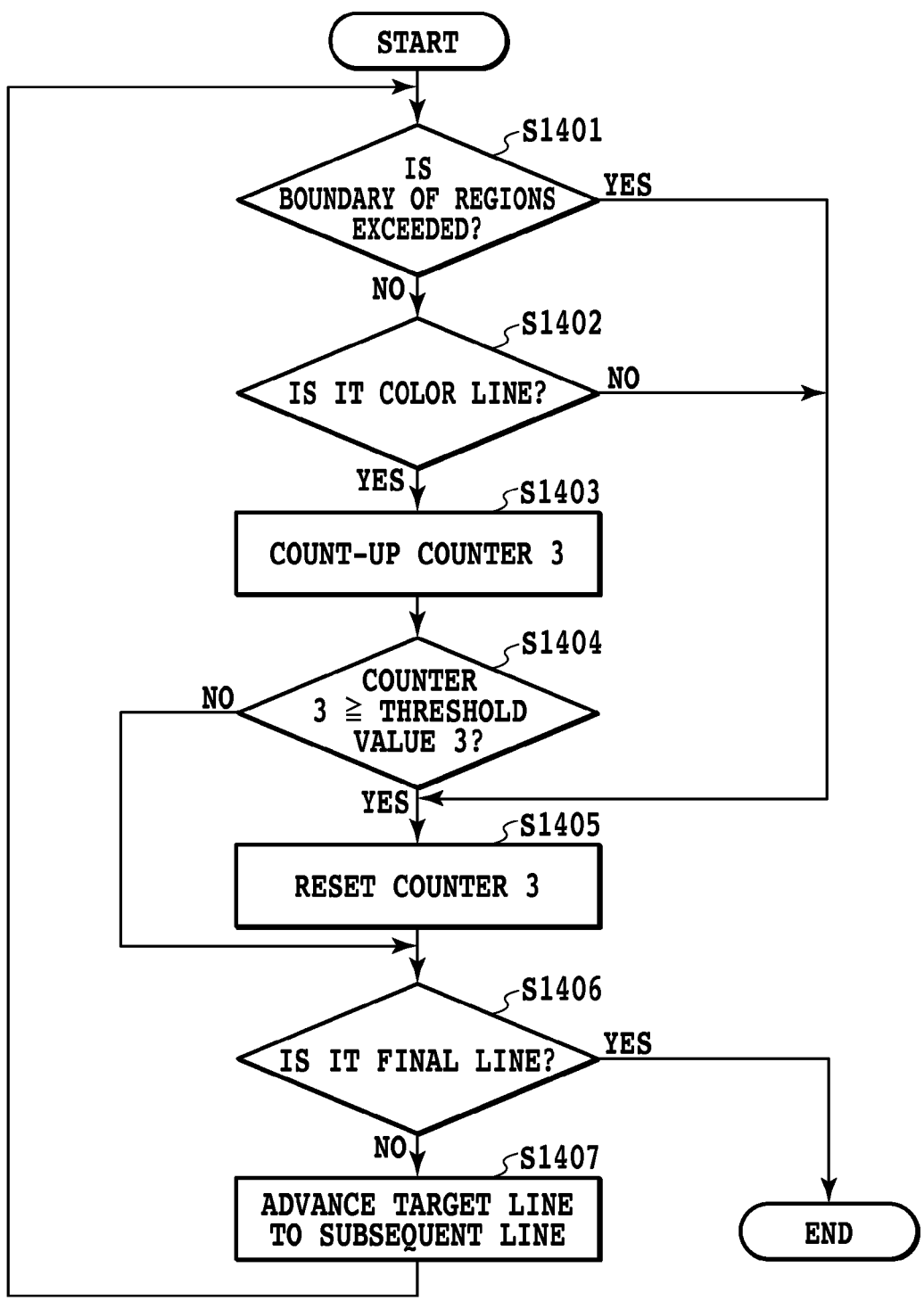
FIG. 12 is a flowchart illustrating a flow of processing of a first sub-scanning continuity recognition processing portion.

FIG. 12 is a flowchart for explaining an operation of the first sub-scanning continuity recognition processing portion 106.

On the basis of the setting result of the region setting portion 101, the first sub-scanning continuity recognition processing portion 106 determines if the target line and a line prior to the target line are different regions or not (Step S1401). If the line prior to the target line is another region, it shows that the line is a boundary of the region.

If it is determined at Step S1401 that the boundary between the region 1 and the region 2 is not exceeded, the first sub-scanning continuity recognition processing portion 106 determines if the target line is determined to be a color line by the first color group recognition processing portion 105 or not (Step S1402).

If the target line is a color line, the counter 3 is counted up (Step S1403).

The first sub-scanning continuity recognition processing portion 106 determines if the count value of the counter 3 has reached a threshold value 3 set in advance or not (Step S1404).

If the count value of the counter 3 has reached the threshold value 3, the counter 3 is reset (Step S1405).

Subsequently, it is determined if the target line is the final line of the document image or not (Step S1406). If the target line is the final line of the document image, the operation of the first sub-scanning continuity recognition processing portion 106 is finished.

If the target line is not the final line of the document image, the subsequent line is made the target line, and the routine returns to Step S1401 (Step S1407).

If it is determined at Step S1401 that the boundary is exceeded, or if the target line is not a color line at Step S1402, the routine goes to Step S1405, and the counter 3 is reset.

Further, if the count value of the counter 3 has not reached the threshold value 3 at Step S1404, the first sub-scanning continuity recognition processing portion 106 determines at Step S1406 if the target line is the final line or not.

As described above, according to the processing shown in FIG. 12, a color line group continuing in the predetermined number (a numeral value of the threshold value 3) can be detected.

Figure 13:
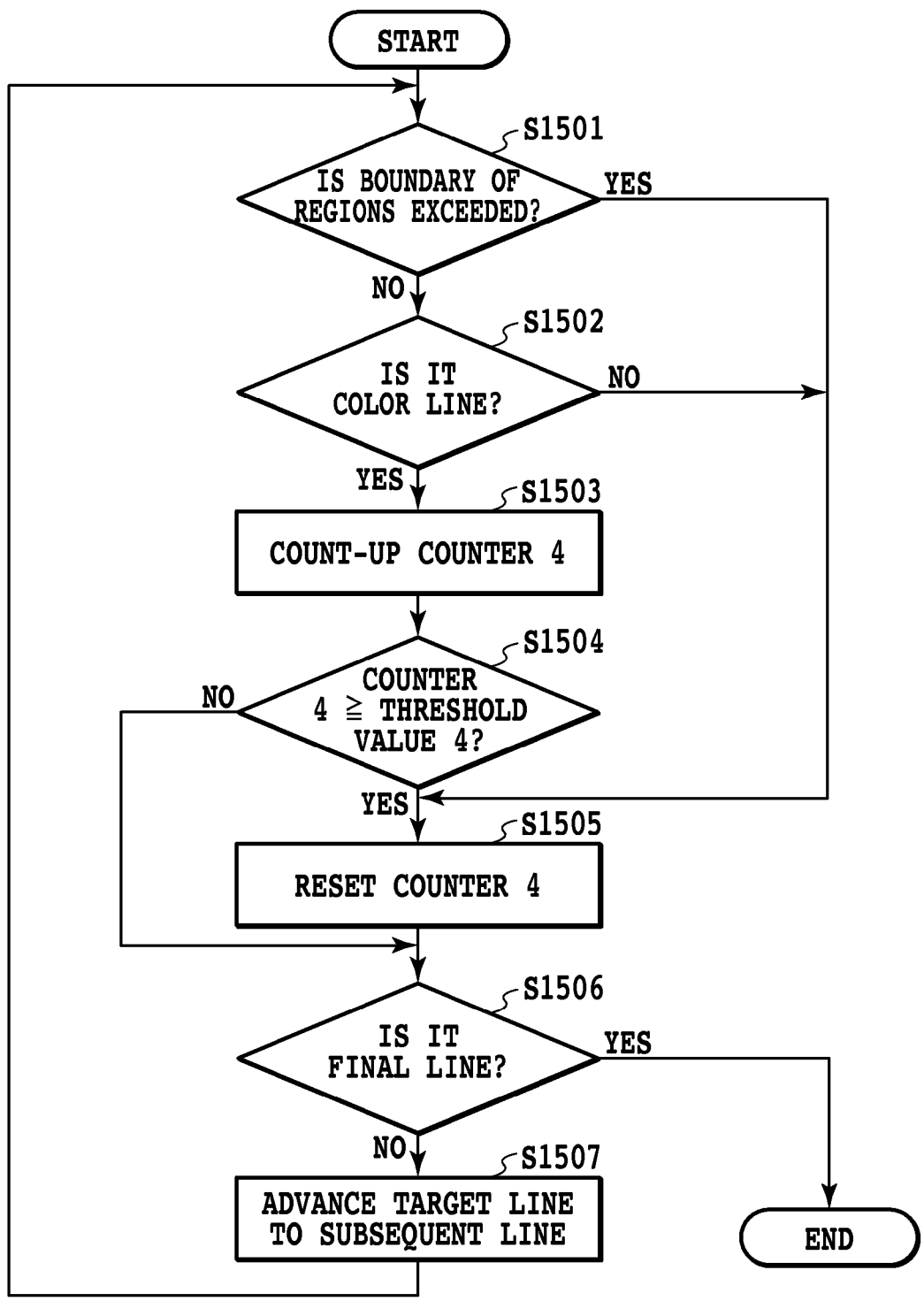
FIG. 13 is a flowchart illustrating a flow of processing of a second sub-scanning continuity recognition processing portion.

FIG. 13 is a flowchart for explaining an operation of the second sub-scanning continuity recognition processing portion 107.

The second sub-scanning continuity recognition processing portion 107 has the same function as the first sub-scanning continuity recognition processing portion 106. A difference is that, while the first sub-scanning continuity recognition processing portion 106 uses the counter 3 and the threshold value 3, the second sub-scanning continuity recognition processing portion 107 uses a counter 4 and a threshold value 4. Further, the threshold value 4 is set at a larger value than the threshold value 3.

On the basis of the setting result of the region setting portion 101, the second sub-scanning continuity recognition processing portion 107 determines if the target line and a line prior to the target line are different regions or not (Step S1501). If the line prior to the target line is another region, it shows that the line is a boundary of the region.

If it is determined at Step S1501 that the boundary between the region 1 and the region 2 is not exceeded, the second sub-scanning continuity recognition processing portion 107 determines if the target line is determined to be a color line by the above-described first color group recognition processing portion 105 or not (Step S1502).

If the target line is a color line, the counter 4 is counted up (Step S1503).

The second sub-scanning continuity recognition processing portion 107 determines if the count value of the counter 4 has reached the threshold value 4 set in advance or not (Step S1504). If the count value of the counter 4 has reached the threshold value 4, the counter 4 is reset (Step S1505).

Then, the second sub-scanning continuity recognition processing portion 107 determines if the target line is the final line of the document image or not (Step S1506).

If the target line is the final line of the document image, the operation of the second sub-scanning continuity recognition processing portion 107 is finished.

If the target line is not the final line of the document image, the subsequent line is made the target line, and the routine returns to Step S1501 (Step S1507).

If it is determined at Step S1501 that the boundary is exceeded, or if the target line is not a color line at Step S1502, the routine goes to Step S1505, and the counter 4 is reset.

Further, if the count value of the counter 4 has not reached the threshold value 4 at Step S1504, the second sub-scanning continuity recognition processing portion 107 determines at Step S1506 if the target line is the final line or not.

Figure 14:
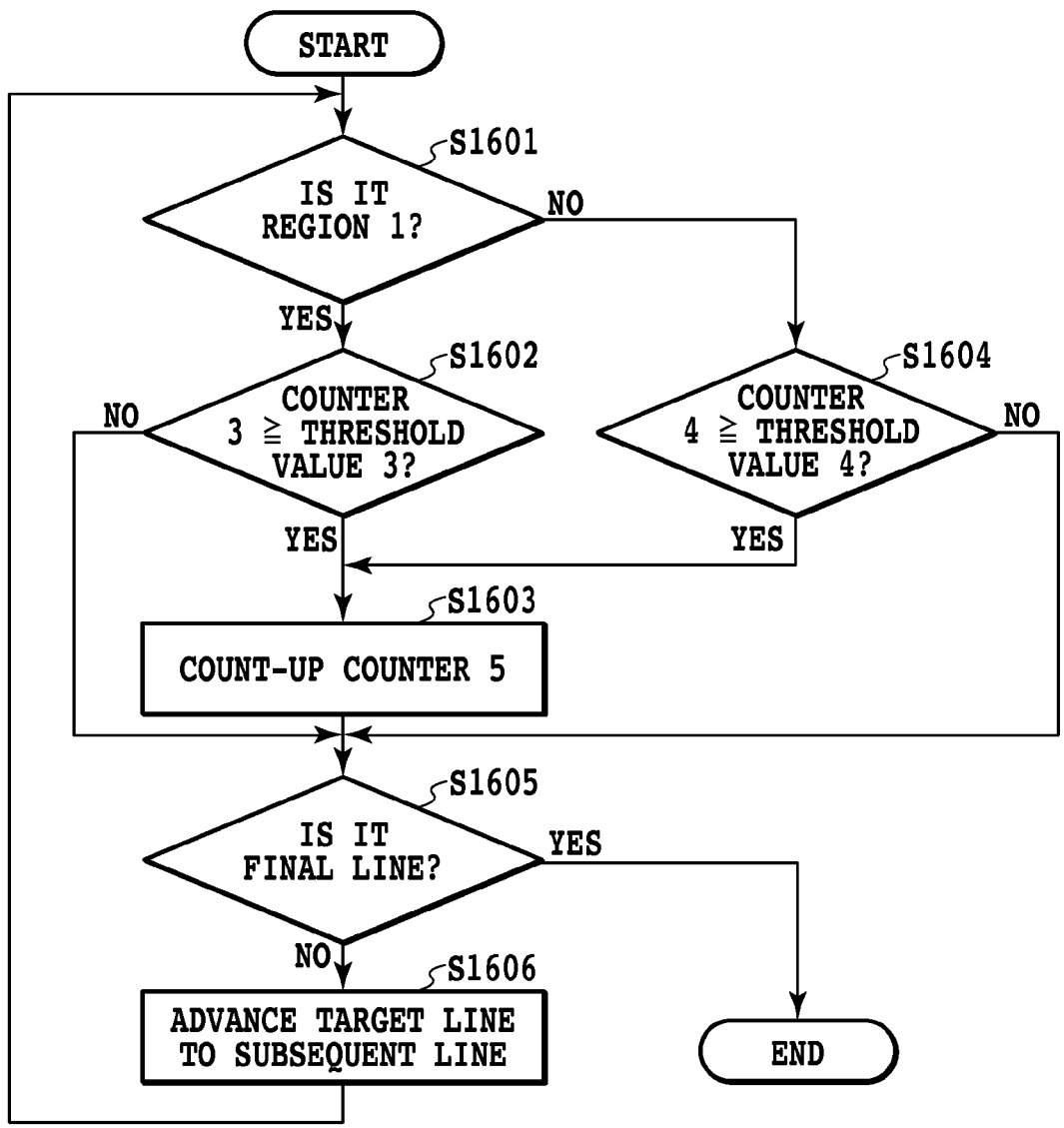
FIG. 14 is a flowchart illustrating a flow of processing of a selector and a main-scanning direction counter.

FIG. 14 is a flowchart for explaining operations of the selector 108 and the main-scanning direction counter 109.

The selector 108 determines, on the basis of the setting result of the region setting portion 101, if the target line is the region 1 (that is, a region with small color shift) or not (Step S1601).

If the target line is the region 1, the main-scanning direction counter 109 determines if the count value of the counter 3 of the first sub-scanning continuity recognition processing portion 106 corresponding to the target line has reached the threshold value 3 or not (Step S1602).

If the count value of the counter 3 of the first sub-scanning continuity recognition processing portion 106 has reached the threshold value 3, a counter 5 is counted up (Step S1603). The counter 5 is a counter for counting the number that the counter 3 has reached the threshold value 3 and the number that the counter 4 has reached the threshold value 4.

Then, the main-scanning direction counter 109 determines if the target line is the final line of the document image or not (Step S1605). If the target line is not the final line of the document image, the subsequent line is made the target line, and the routine returns to Step S1601 (Step S1606). If the target line is the final line of the document image, the operations of the selector 108 and the main-scanning direction counter 109 are finished.

If it is determined at Step S1601 that the target line is not the region 1, the main-scanning direction counter 109 determines if the count value of the counter 4 of the second sub-scanning continuity recognition processing portion 107 corresponding to the target line has reached the threshold value 4 or not (Step S1604).

If the count value of the counter 4 of the second sub-scanning continuity recognition processing portion 107 has reached the threshold value 4, the routine goes to Step S1603, and the counter 5 is counted up (Step S1604).

If the count value of the counter 3 of the first sub-scanning continuity recognition processing portion 106 has not reached the threshold value 3 at Step S1602, or if the count value of the counter 4 of the second sub-scanning continuity recognition processing portion 107 has not reached the threshold value 4 at Step S1604, the routine goes to Step S1605.

As described above, according to the processing shown in FIG. 14, in the region 1, the counter 5 is counted up only on the line in which the counter 3 has reached the threshold value 3, while in the region 2, the counter 5 is counted up only on the line in which the counter 4 has reached the threshold value 4. As a result, from the image data, the total number of the color line drawings having the width of the threshold value 3 and extending in the main-scanning direction in the region 1 and the color line drawings having the width of the threshold value 4 and extending in the main-scanning direction in the region 2 can be obtained from the value of the counter 5. That is, according to the processing shown in FIG. 14, in the region 1 (first region) where color shift hardly occurs, a first color line drawing having a predetermined width and extending in the main-scanning direction can be detected. In addition, in the region 2 (second region) where color shift easily occurs, a second line drawing having a predetermined width and extending in the main-scanning direction can be detected. Since the threshold value 4 is set at value larger than the threshold value 3, the width of the second color line drawing is larger than that of the first color line drawing.

In the region where color shift easily occurs as above, by detecting a wider color line drawing, a color line drawing other than the color line drawing caused by color shift can be detected.

Further, in this embodiment, both in the region 1 and the region 2, the color line drawings with the same length are detected in the main-scanning direction (that is, the values of the threshold value 1 and the threshold value 2 are not changed between the regions). That is because, as described above, a merit in changing the length of the color line drawing in the main-scanning direction to be detected by the difference between the regions is small since a direction where color shift easily occurs is the sub-scanning direction.

Figure 17:
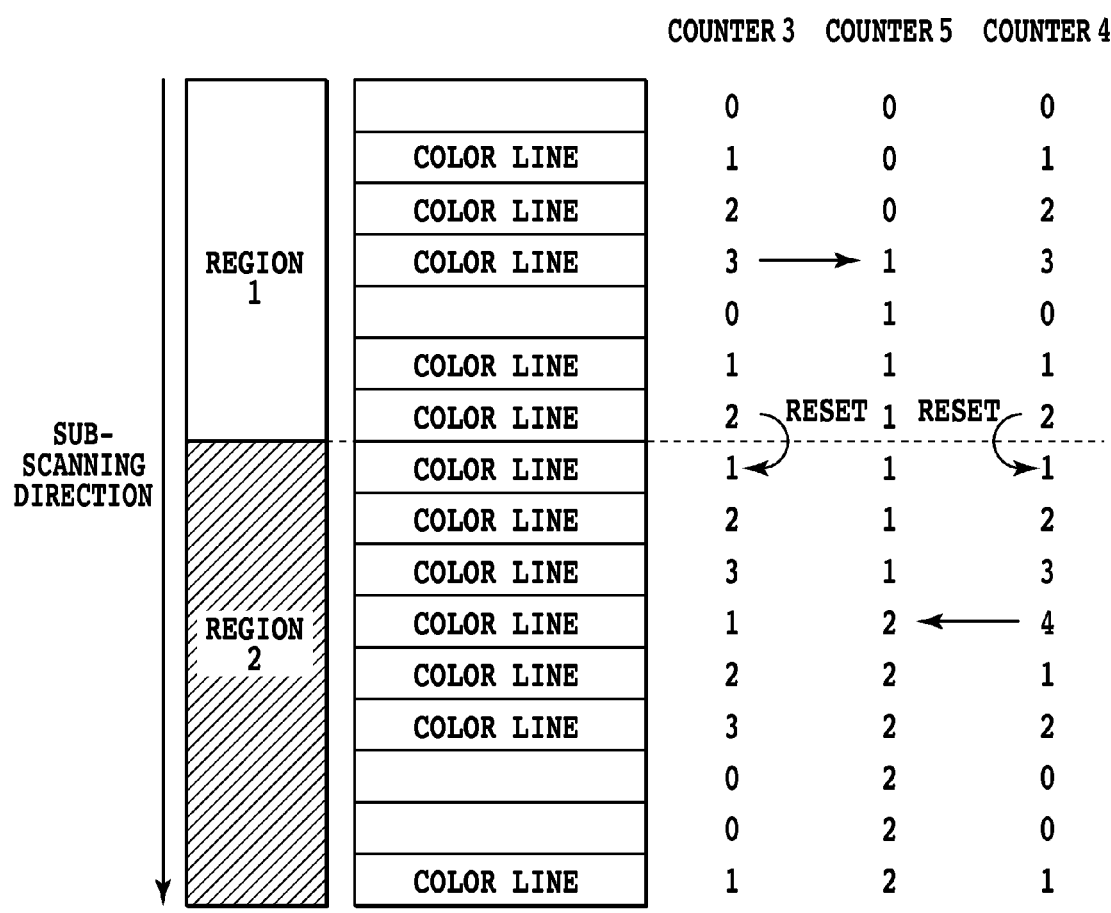
FIG. 17 is a chart illustrating a flow of processing of a first sub-scanning count portion.

FIG. 17 is a diagram illustrating an example of a relationship between the image data and each counter when the threshold value 3=3 and the threshold value 4=4. A state in which the counter 3 and the counter 4 are reset at the boundary part between the region 1 and the region 2 is confirmed. In addition, it is confirmed that in the region 1, the counter 5 is counted up only if the counter 3 has reached the threshold value 3, while in the region 2, the counter 5 is counted up only if the counter 4 has reached the threshold value 4.

In the above-described main-scanning direction detection portion 110, by setting the value of the threshold value 1 to the length of the color line drawing extending in the main-scanning direction to be detected, a characteristic to detect the line drawing as 602 in FIG. 5 can be provided. Further, by setting the threshold value 4 at the line number or more influenced by color shift in the sub-scanning direction, even in the region 2 with large color shift, a monochrome image can be determined to be monochrome without erroneously determining it as a color image. The line number influenced by color shift at this time is 2 lines in the case of FIGS. 3 and 4, for example. Furthermore, a color line drawing having a line width of the line number or more influenced by color shift in the sub-scanning direction and extending in the main-scanning direction can be determined to be color.

Moreover, since it is not necessary to consider the influence of color shift for the threshold value 3, setting for a color line drawing having a line width to be detected in the main-scanning direction can be made.

The sub-scanning direction detection portion 115 will be described below in detail.

Figure 15:
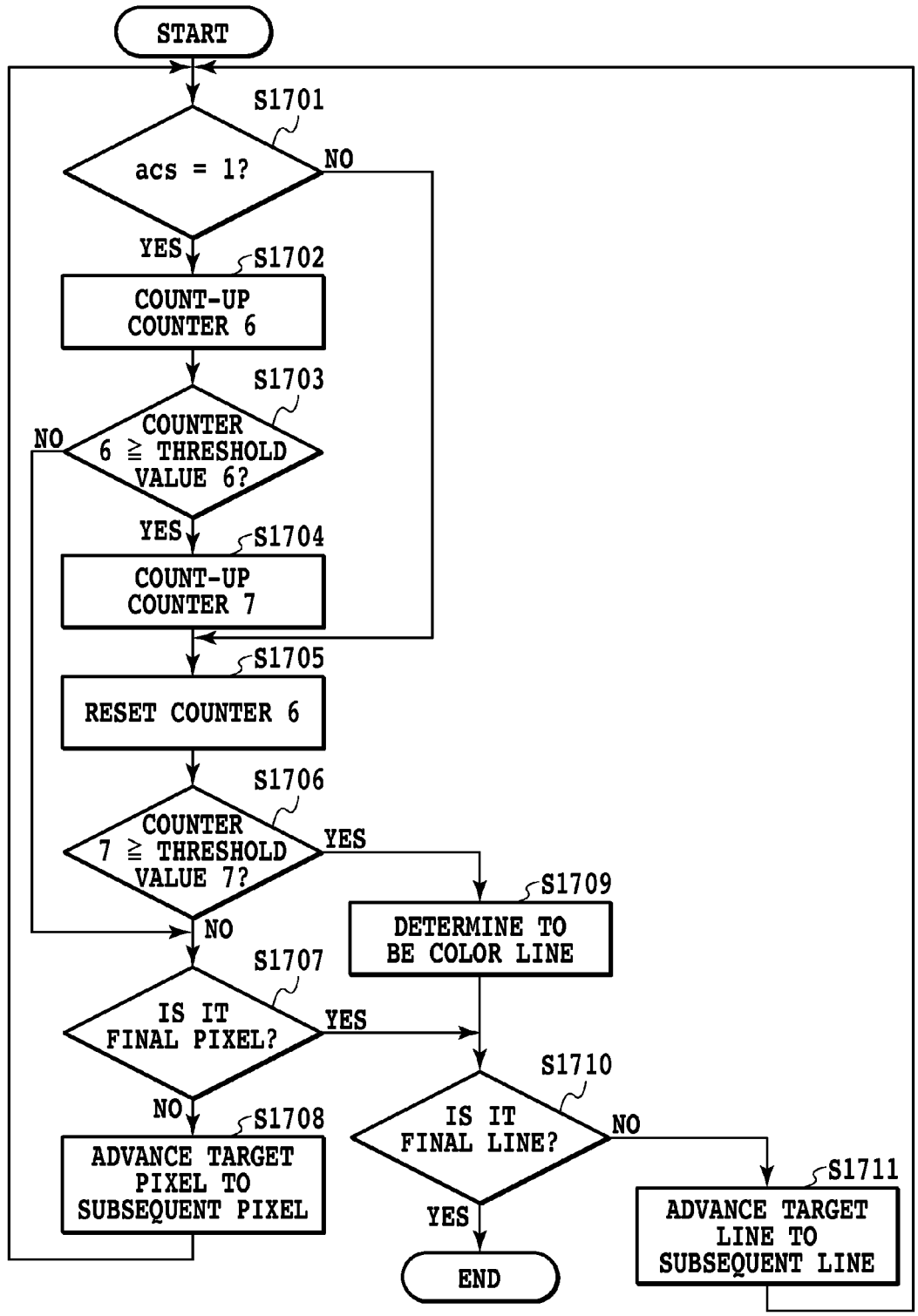
FIG. 15 is a flowchart illustrating a flow of processing of a second main-scanning color group recognition portion.

FIG. 15 is a flowchart illustrating an operation to determine if the target line is a color line or not by the second main-scanning continuity recognition processing portion 111 and the second color group recognition processing portion 112.

The second main-scanning continuity recognition processing portion 111 has the same function as the first main-scanning continuity recognition processing portion 104. In addition, the second color group recognition processing portion 112 has the same function as the first color group recognition processing portion 105. A difference is that, while the first main-scanning continuity recognition processing portion 104 and the first color group recognition processing portion 105 use the counter 1, the threshold value 1, the counter 2, and the threshold value 2, the second main-scanning continuity recognition processing portion 111 and the second color group recognition processing portion 112 use a counter 6, a threshold value 6, a counter 7, and a threshold value 7.

Figure 16:
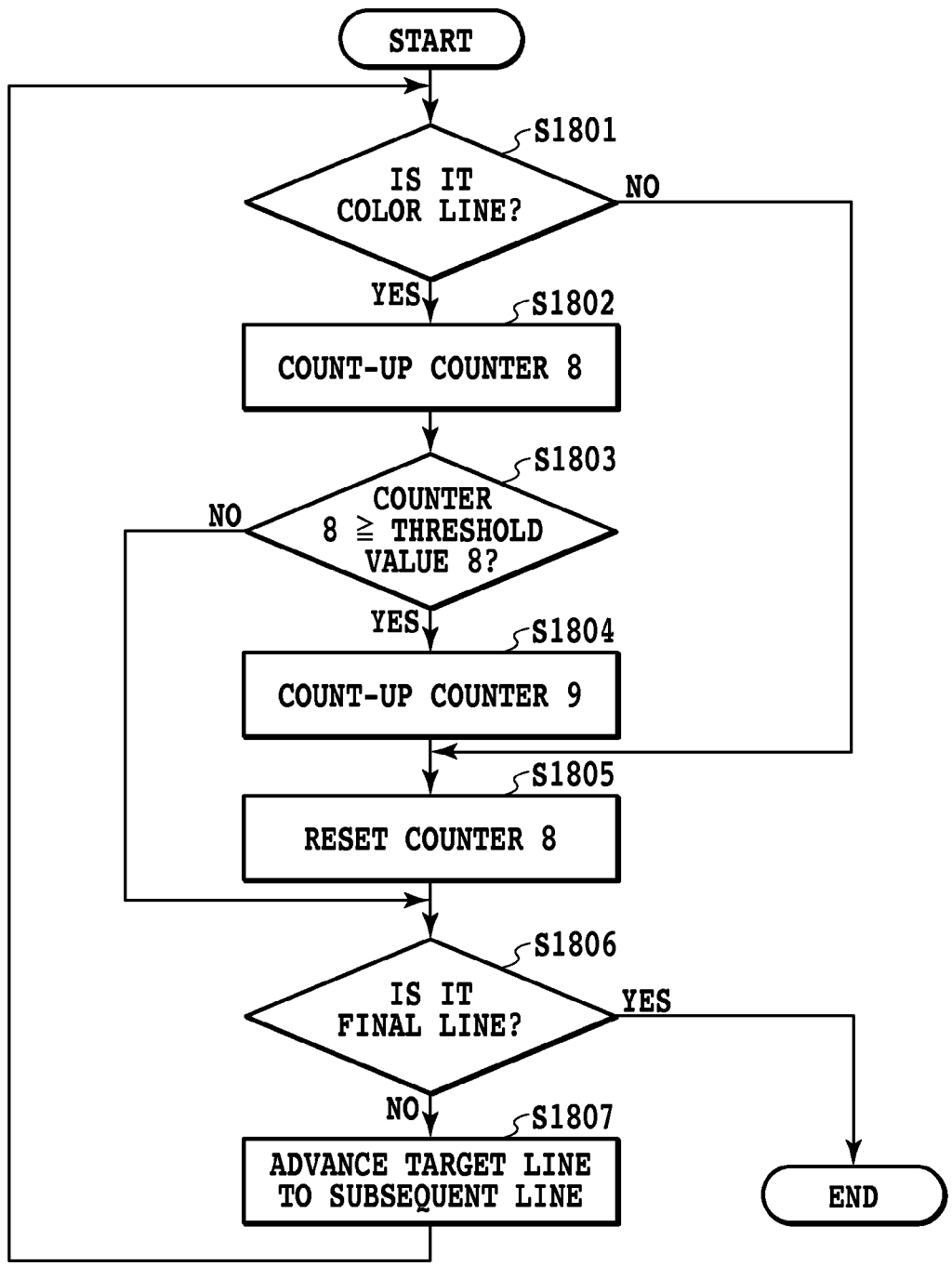
FIG. 16 is a flowchart illustrating a flow of processing of a second sub-scanning count portion.

FIG. 16 is a flowchart illustrating an operation of the sub-scanning direction detection portion to detect a color line drawing extending in the sub-scanning direction by the second sub-scanning continuity recognition processing portion 113 and the sub-scanning direction counter 114.

The second sub-scanning continuity recognition processing portion 113 determines if the target line is determined to be a color line by the above-described second color group recognition processing portion 112 or not (Step S1801). If the target line is a color line, the counter 8 is counted up (Step S1802).

The second sub-scanning continuity recognition processing portion 113 determines if a count value of the counter 8 has reached a threshold value 8 set in advance or not (Step S1803). If the count value of the counter 8 has reached the threshold value 8, a counter 9 is counted up (Step S1804). Then, the counter 8 is reset (Step S1805).

It is determined if the target line is the final line of the document image or not (Step S1806). If the target line is the final line of the document image, the operation of the sub-scanning direction detection portion 115 is finished.

If the target line is not the final line of the document image, the subsequent line is made the target line, and the routine returns to Step S1801 (Step S1807).

If the target line is not a color line at Step S1801, the routine goes to Step S1805, and the counter 8 is reset. If the count value of the counter 8 has not reached the threshold value 8 set in advance at Step S1803, the routine goes to Step S1806.

As described above, according to the processing shown in FIG. 16, the counter 9 is counted up each time the number of color lines in the main-scanning direction continues in the sub-scanning direction by the value of the threshold value 8, and the counter 8 is reset. As a result, from the image data, the total number of the color line drawings (third color line drawings) with the length of the threshold value 8 and extending in the sub-scanning direction can be obtained from the value of the counter 9.

In the processing shown in FIG. 16, a color line drawing having the same width and extending in the sub-scanning direction is detected in both the region 1 and the region 2 (that is, the value of the threshold value 6 is not changed between the regions). That is because, as described above, a merit in changing the width of the color line drawing in the main-scanning direction to be detected by the difference between the regions is small since a direction where color shift easily occurs is the sub-scanning direction. However, not limited to this method, color line drawings having different widths depending on the region may be detected.

Further, in the processing shown in FIG. 16, in either of the region 1 and the region 2, a color line drawing having the same length extending in the sub-scanning direction is detected (that is, the value of the threshold value 8 is not changed by the difference between the regions). That is because erroneous determination of ACS rarely occurs since an influence amount by color shift on the length in the sub-scanning direction is small on the line drawing extending in the sub-scanning direction thereof as shown in FIG. 3B and the like. However, not limited to this method, color line drawings having different lengths depending on the regions may be detected.

Figure 18:
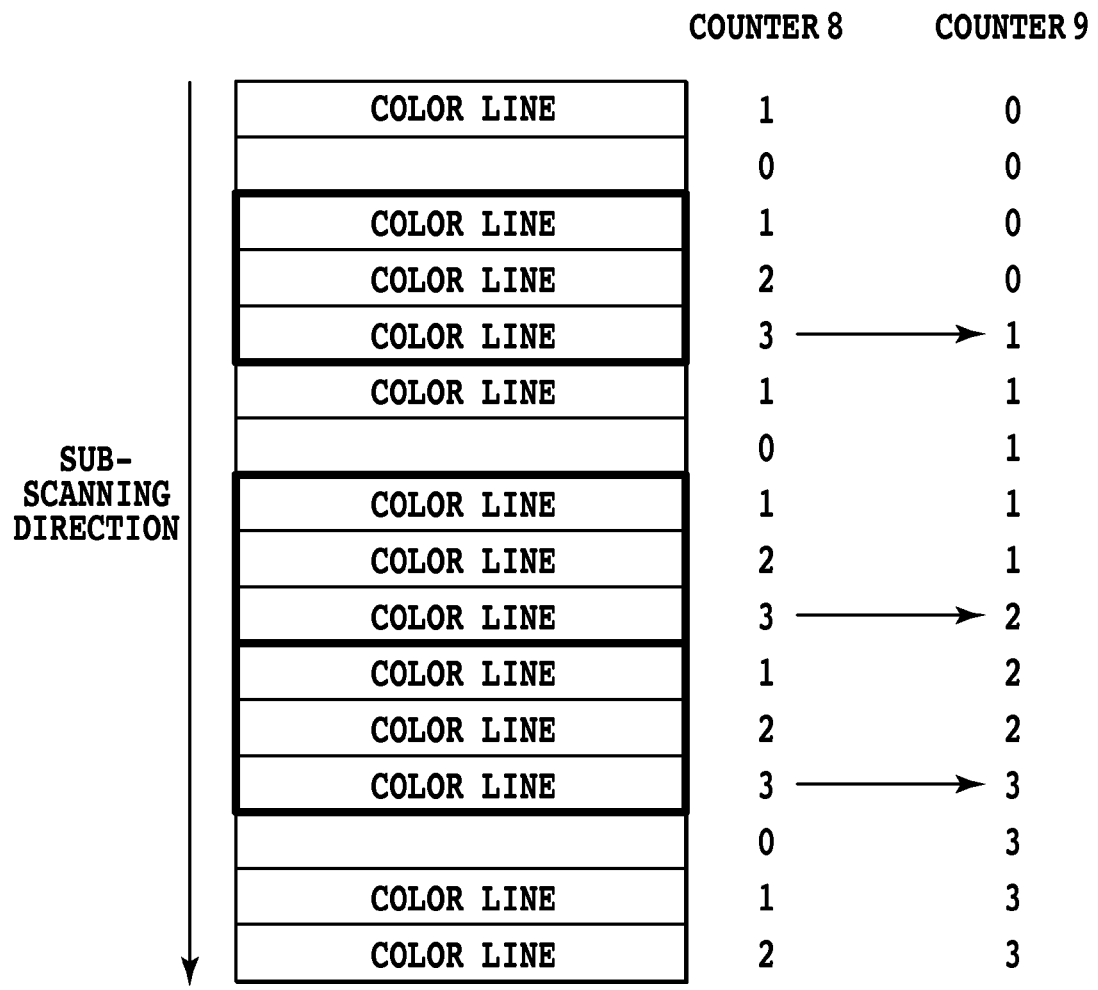
FIG. 18 is a chart illustrating a flow of processing of the second sub-scanning count portion.

FIG. 18 shows an example illustrating a relationship between the image data and the counters 8 and 9 when the threshold value 8=3. A state can be confirmed that each time three color lines continue, the counter 8 is reset, and the counter 9 is counted up.

In the sub-scanning direction detection portion 115 described above, the threshold value 6 is set at a line width of a color line drawing extending in the sub-scanning direction to be detected, and the threshold value 8 is set at the length of the color line drawing extending in the sub-scanning direction. As a result, a characteristic to detect a color line drawing as indicated by reference numeral 603 in FIG. 5 can be provided.

In the region with large color shift, several lines of fake colors that can be color in the sub-scanning direction are generated as 504 in FIG. 4B. However, since they are sufficiently small for the threshold value 8, it is not necessary to provide a plurality of the sub-scanning continuity recognition processing portions for each region like the main-scanning direction detection portion 110.

As a result, in a target block in the image data, if a color line drawing extending in the sub-scanning direction to be detected is present at a position across the region with large color shift and the region without, color determination can be made without it being subjected to an influence due to the difference between the regions.

After the determination of a color line by the sub-scanning direction detection portion 115, since the continuity of them in the sub-scanning direction is counted, a color line drawing extending diagonally upward in the document can be also detected by this block.

After the processing by the main-scanning direction detection portion 110 and the sub-scanning direction detection portion 115 described above, the document determination portion 116 determines if the document is color or monochrome on the basis of the numbers indicated by the counter 5 of the main-scanning direction detection portion 110 and the counter 9 of the sub-scanning direction detection portion 115. For example, if the counter 5 has reached the threshold value 5 set in advance or the counter 9 has reached the threshold value 9 set in advance, the document determination portion 116 determines that the document is a color document. If neither of the counters has reached the respective threshold values, the document is determined to be a monochrome document. The determining method of the document determination portion 116 is not limited to the above, but the color document determination may be made only if the counter 5 has reached the threshold value 5 and also the counter 9 has reached the threshold value 9.

Each block in the above processing may be realized by an integrated circuit or software. In addition, the block may be realized by combination of them.

As for the main-scanning direction detection portion 110 and the sub-scanning direction detection portion 115 descried above, the following can be true in the region with large color shift.

In the main-scanning direction detection portion subjected to the influence of color shift in color determination of a document, a length of a line drawing to be detected can be set longer (that is, the value of the threshold value 4 can be set larger) by the influence amount.

Further, in the sub-scanning direction detection portion where an influence of color shift is small in color determination of a document, since the operation is not switched for each region, a color line drawing extending in the sub-scanning direction across the regions can be detected.

As described above, the image determining apparatus provided with the ACS function that does not erroneously determine a monochrome document as color by a fake color generated by color shift can be provided without lowering color determination sensitivity for a region or a component subjected to the color shift.

Second Embodiment

Due to color shift in the sub-scanning direction, approximately two lines of color pixels may be generated in a monochrome line drawing extending in the sub-scanning direction as in FIG. 4B. The region with large color shift can execute ACS hardly affected by the color shift if a threshold value of color determination is set larger than that for the region where color shift is not large.

However, there can be a case in which it is not preferable to use the first sub-scanning count portion 118 described as the sub-scanning direction detection portion in the first embodiment as it is. That is because the first sub-scanning count portion 118 resets count of the color continuity in the sub-scanning direction at the boundary portion between the region with large color shift and the region without it. As a result, a color line drawing extending in the sub-scanning direction crosses the boundary portion, and whereby a color line drawing cannot be detected easily.

In this second embodiment, in the region with large color shift and the region without it, a method in which color detection capability is not lowered even if a color line drawing extending in the sub-scanning direction to be detected crosses the boundary between the both regions, while color determination sensitivity of the sub-scanning direction detection portion is switched.

Figure 19B:
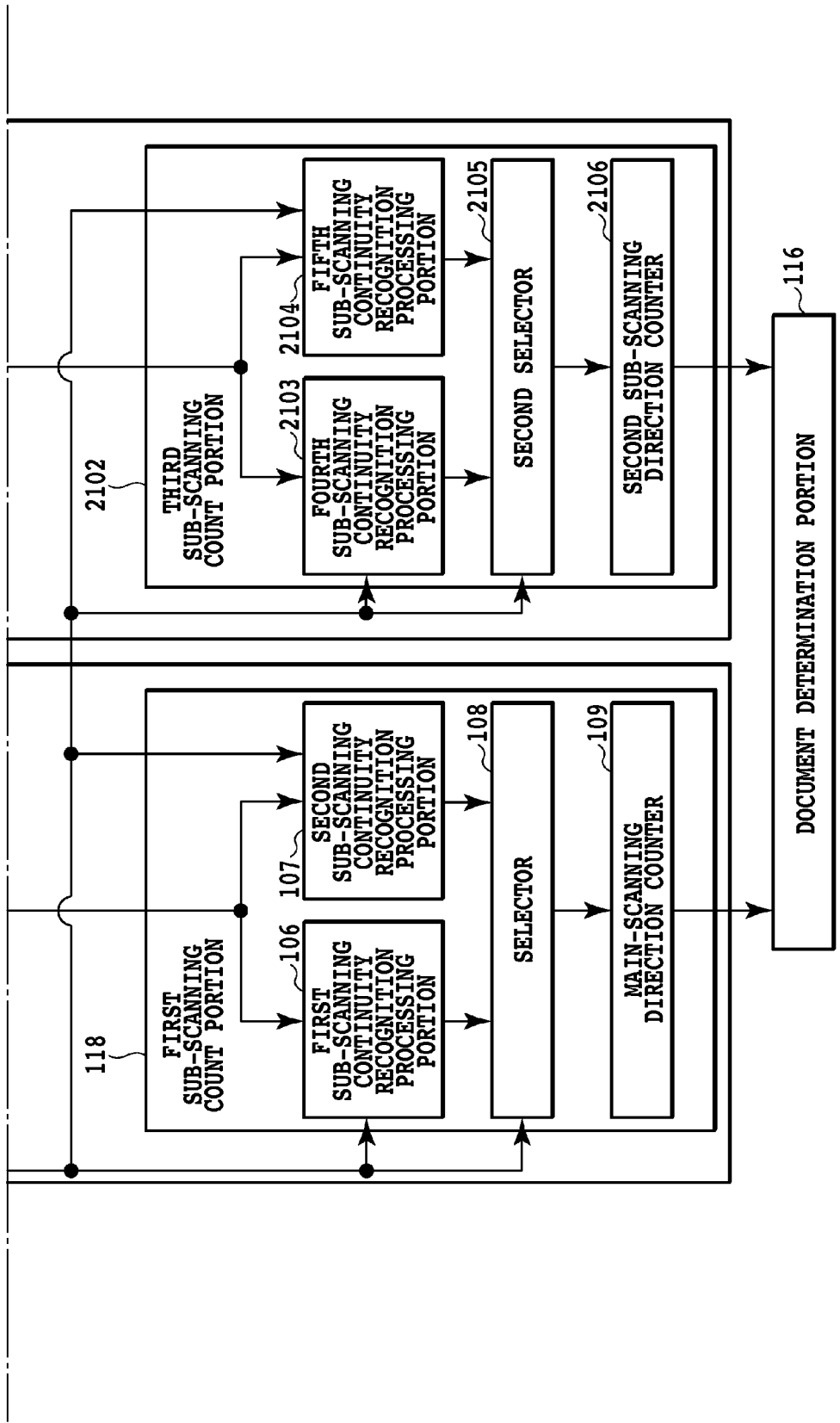

FIGS. 19A and 19B are block diagrams illustrating a configuration of an image determining apparatus that realizes the second embodiment according to the present invention. Those given the same reference numerals as in FIGS. 1A and 1B operate similarly to the first embodiment.

In this embodiment, the sub-scanning direction detection portion 115 in the first embodiment is replaced by a sub-scanning direction detection portion 2101.

The main-scanning direction detection portion 110 and the sub-scanning direction detection portion 2101 execute processing in parallel, respectively. Upon receipt of results of color images detected by each of them, the document determination portion 116 determines if the document to be processed is a color document or a monochrome document.

The sub-scanning direction detection portion 2101 is roughly composed of the second main-scanning color group recognition portion 119 and a third sub-scanning count portion 2102.

The third sub-scanning count portion 2102 is provided with a fourth sub-scanning continuity recognition processing portion 2103, a fifth sub-scanning continuity recognition processing portion 2104, a second selector 2105, and a second sub-scanning direction counter 2106.

The fourth sub-scanning continuity recognition processing portion 2103 detects a lump of color in the sub-scanning direction in a region where color shift is not large by counting continuity if color lines are continuously present in the sub-scanning direction. At this time, by referring to the setting of the region setting portion 101, a reset operation of the counter is controlled. The function of the fifth sub-scanning continuity recognition processing portion 2104 is the same as that of the fourth sub-scanning continuity recognition processing portion 2103, but in order to change sensitivity to detect the lump of color in the sub-scanning direction in the region with large color shift, it is operated with various threshold values different from those of the fourth sub-scanning continuity recognition processing portion 2103. The second selector 2105 selects the results of the fourth sub-scanning continuity recognition processing portion 2103 and the fifth sub-scanning continuity recognition processing portion 2104 by region, referring to the setting of the region setting portion 101. The second sub-scanning direction counter 2106 counts the total number of detected lumps of color in the sub-scanning direction detection portion 2101.

Figure 21:
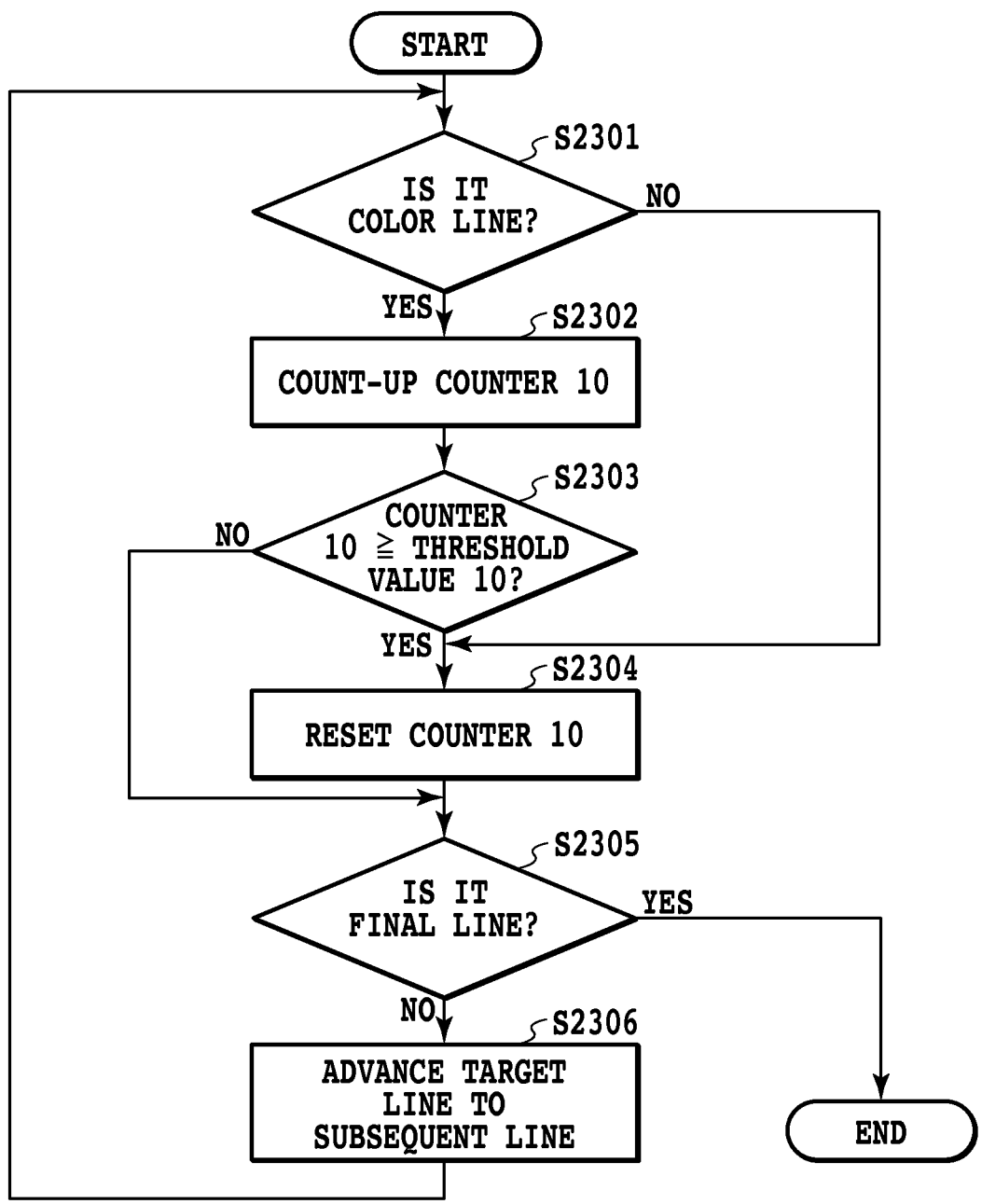
FIG. 21 is a flowchart illustrating a flow of processing of a fourth sub-scanning continuity recognition processing portion.

FIG. 21 is a flowchart for explaining an operation of the fourth sub-scanning continuity recognition processing portion 2103.

The fourth sub-scanning continuity recognition processing portion 2103 determines if color line determination is made for the target line by the above-described second color group recognition processing portion 112 or not (Step S2301). If the target line is a color line, the counter 10 is counted up (Step S2302).

The fourth sub-scanning continuity recognition processing portion 2103 determines if a count value of the counter 10 has reached a threshold value 10 set in advance or not (Step S2303). If the count value of the counter 10 has reached the threshold value 10, the counter 10 is reset (Step S2304).

Then, the fourth sub-scanning continuity recognition processing portion 2103 determines if the target line is the final line of the document image or not (Step S2305). If the target line is the final line of the document image, the operation of the fourth sub-scanning continuity recognition processing portion 2103 is finished.

If the target line is not the final line of the document image, the subsequent line is made the target line, and the routine returns to Step S2301 (Step S2306). If the target line is not a color line at Step S2301, the routine goes to Step S2304, and the counter 10 is reset.

Further, if the count value of the counter 10 has not reached the threshold value 10 at Step S2303, the fourth sub-scanning continuity recognition processing portion 2103 determines if the target line is the final line or not at Step S2305.

As described above, according to the processing shown in FIG. 21, a color line group continuous in a predetermined number (the numeral value of the threshold value 10) can be detected.

Figure 22:
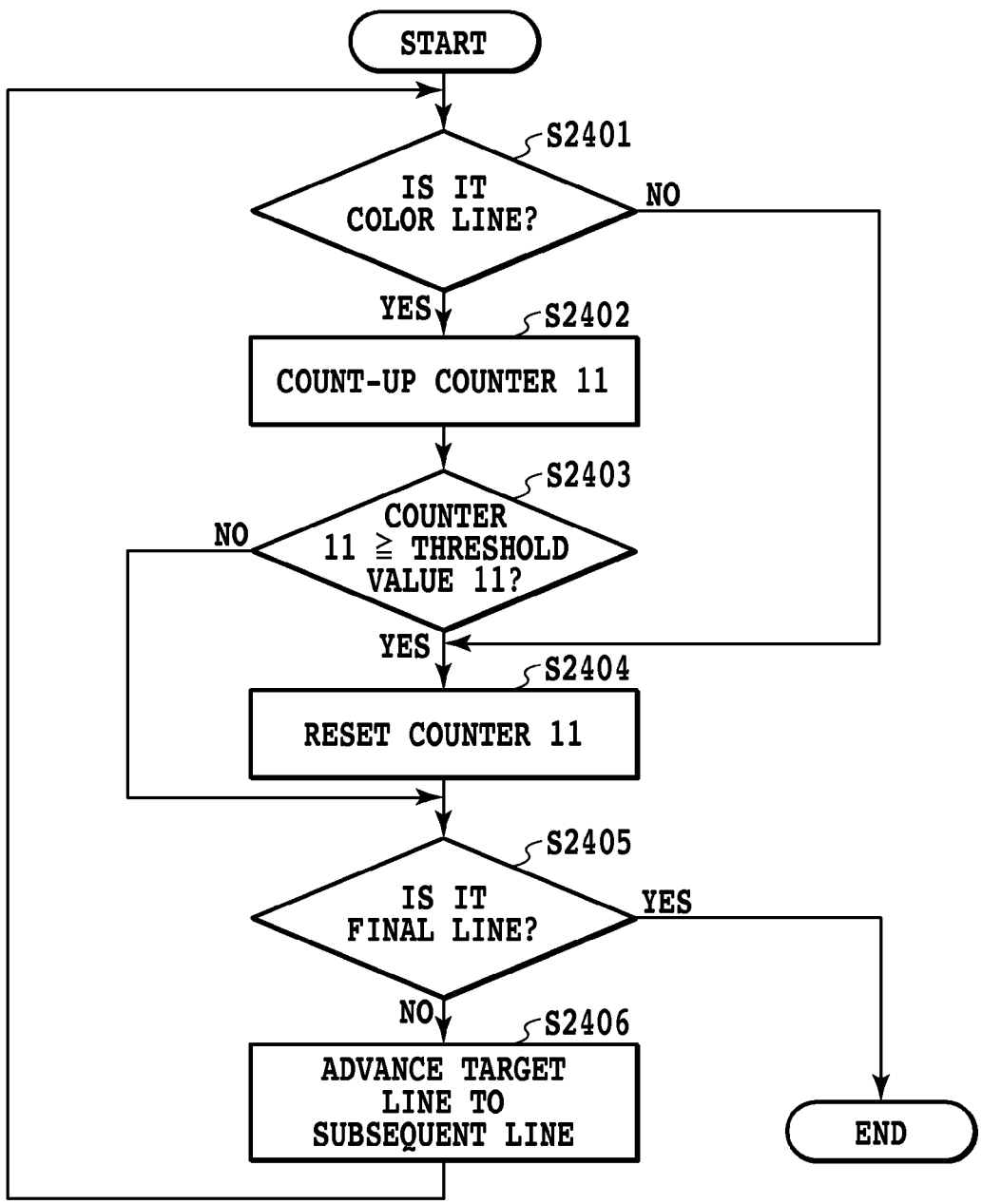
FIG. 22 is a flowchart illustrating a flow of processing of a fifth sub-scanning continuity recognition processing portion.

FIG. 22 is a flowchart for explaining an operation of the fifth sub-scanning continuity recognition processing portion 2104.

The fifth sub-scanning continuity recognition processing portion 2104 has the same function as the fourth sub-scanning continuity recognition processing portion 2103. A difference is that, while the fourth sub-scanning continuity recognition processing portion 2103 uses the counter 10 and the threshold value 10, the fifth sub-scanning continuity recognition processing portion 2104 uses a counter 11 and a threshold value 11.

The fifth sub-scanning continuity recognition processing portion 2104 determines if color line determination is made for the target line by the above-described second color group recognition processing portion 112 or not (Step S2401). If the target line is a color line, the counter 11 is counted up (Step S2402).

The fifth sub-scanning continuity recognition processing portion 2104 determines if the count value of the counter 11 has reached a threshold value 11 set in advance or not (Step S2403). If the count value of the counter 11 has reached the threshold value 11, the counter 11 is reset (Step S2404).

Then, the fifth sub-scanning continuity recognition processing portion 2104 determines if the target line is the final line of the document image or not (Step S2405). If the target line is the final line of the document image, the operation of the fifth sub-scanning continuity recognition processing portion 2104 is finished.

If the target line is not the final line of the document image, the subsequent line is made the target line, and the routine returns to Step S2401 (Step S2406). If the target line is not a color line at Step S2401, the routine goes to Step S2404, and the counter 11 is reset.

Further, if the count value of the counter 11 has not reached the threshold value 11 at Step S2403, the fifth sub-scanning continuity recognition processing portion 2104 determines if the target line is the final line or not at Step S2405.

As described above, according to the processing shown in FIG. 22, the color line group continuous in the predetermined number (the numeral value of the threshold value 11) can be detected.

Figure 23:
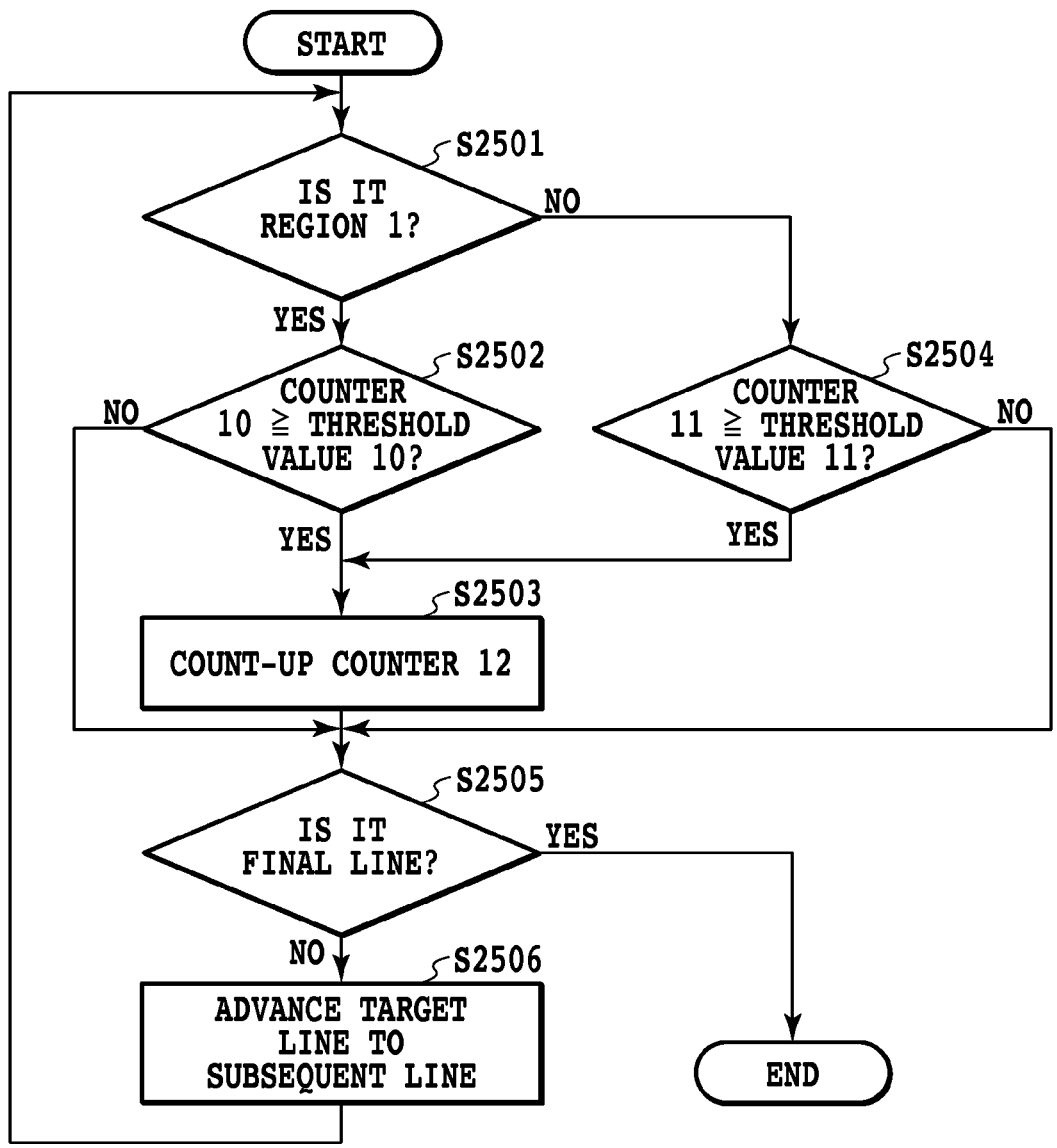
FIG. 23 is a flowchart illustrating a flow of processing of a second selector and a second sub-scanning direction counter.

FIG. 23 is a flowchart for explaining an operation of the second selector 2105 and the second sub-scanning direction counter 2106.

The second selector 2105 determines if the target line is a line belonging to the region 1 or not on the basis of a setting result of the region setting portion 101 (Step S2501).

If the target line belongs to the region 1, the second selector 2105 determines if the count value of the counter 10 of the fourth sub-scanning continuity recognition processing portion 2103 has reached the threshold value 10 or not (Step S2502).

If the count value of the counter 10 of the fourth sub-scanning continuity recognition processing portion 2103 has reached the threshold value 10, the counter 5 is counted up (Step S2503).

Then, it is determined if the target line is the final line of the document image or not (Step S2505). If the target line is not the final line of the document image, the subsequent line is made the target line, and the routine returns to Step S2501 (Step S2506). If the target line is the final line of the document image, the operations of the second selector 2105 and the second sub-scanning direction counter 2106 are finished.

If it is determined at Step S2501 that the target line does not belong to the region 1, it is determined if the count value of the counter 11 of the fifth sub-scanning continuity recognition processing portion 2104 has reached the threshold value 11 or not (Step S2504). If the count value of the counter 11 of the fifth sub-scanning continuity recognition processing portion 2104 has reached the threshold value 11, the routine goes to Step S2503, and the counter 5 is counted up (Step S2504).

If the value of the counter 10 of the fourth sub-scanning continuity recognition processing portion 2103 has not reached the threshold value 10 at Step S2502 or if the value of the counter 11 of the fifth sub-scanning continuity recognition processing portion 2104 has not reached the threshold value 11 at Step S2504, the routine goes to Step S2505.

Figure 20:
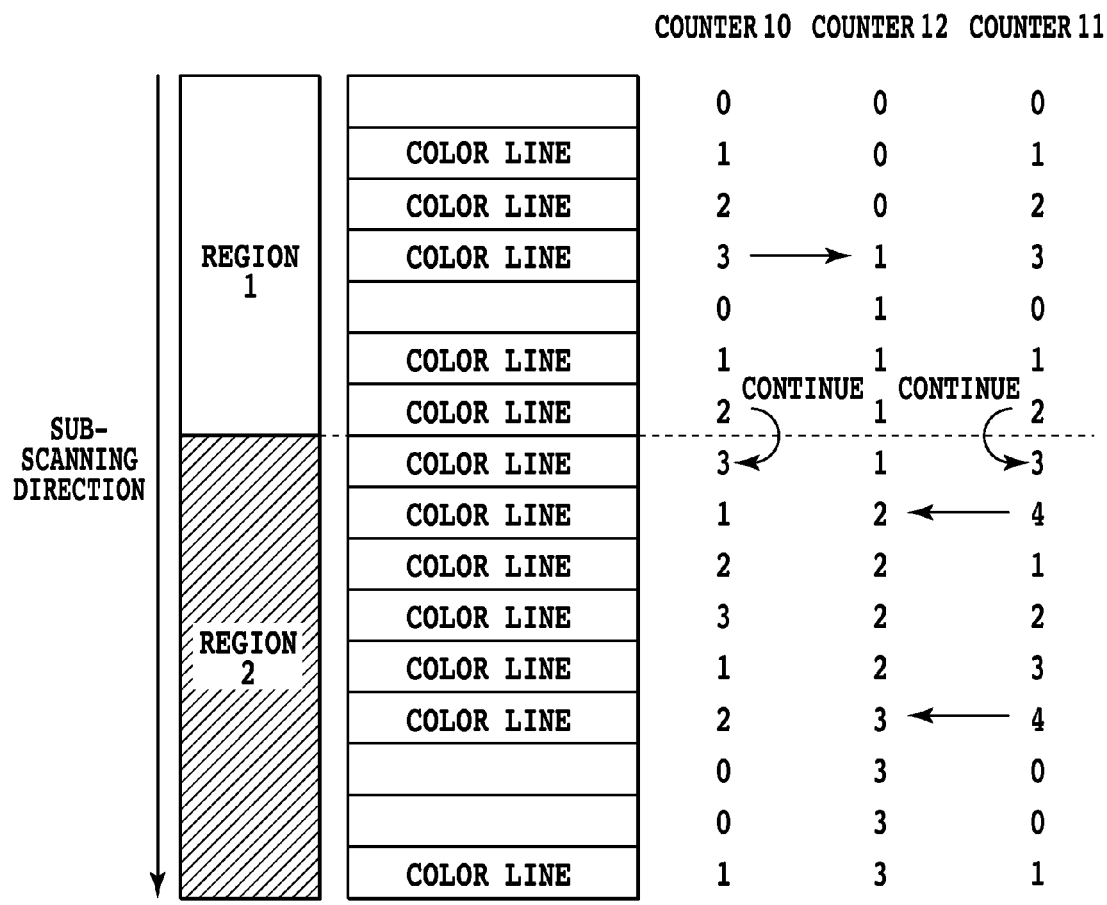
FIG. 20 is a diagram for explaining an operation result of a third sub-scanning count portion.

FIG. 20 is a diagram showing an example illustrating a relationship between the image data and each counter when the threshold value 10=3 and the threshold value 11=4. A state in which the counter 10 and the counter 11 are not reset at the boundary portion between the region 1 and the region 2 but are continued can be confirmed. In addition, it can be confirmed that the counter 12 is counted up only if the counter 10 has reached the threshold value 10 in the region 1 and that the counter 11 is counted up only if the counter 11 has reached the threshold value 11 in the region 2.

In the sub-scanning direction detection portion 2101 described above, by making the threshold value 11 larger than the threshold value 10 and by making the threshold value for color determination in the region with large color shift larger than that in the region with small color shift, the ACS in which erroneous determination caused by color shift hardly occurs can be realized.

Moreover, since the counter 10 and the counter 11 are not reset at the boundary portion of the regions, a color line drawing extending in the sub-scanning direction and crossing the boundary portion of the regions is detected as one color line drawing (third color line drawing). As a result, such a situation across the boundary that a color line drawing not reaching a predetermined length in one region cannot be detected can be avoided. According to the processing in FIG. 23, if the color line drawing crosses the boundary portion of the regions, which of the region 1 and the region 2 the color line drawing belongs to is determined on the basis of the end position of the color line drawing, but a method is not limited to this. Which of the regions the color line drawing belongs to may be determined on the basis of a start position of the color line drawing or a ratio of the portion which the color line drawing belongs to.

Further, by setting the threshold value 10 and the threshold value 11 at the same set value, the operation equivalent to that of the sub-scanning direction detection portion 115 is ensured.

Third Embodiment

In the main-scanning direction detection portion 110 and the sub-scanning direction detection portion 2101 described above are different in a point on whether a counter is reset or not at the boundary portion between the region with large color shift and the region with small color shift for the first, second, fourth and fifth sub-scanning continuity recognition processing portions (106, 107, 2103 and 2104). The functions are equal in the other blocks.

Thus, if the present invention is to be put into practice, two sets of the same function blocks in which whether the counter is reset or not at the boundary portion between the region with large color shift and the region with small color shift can be switched for the first, second, fourth and fifth sub-scanning continuity recognition processing portions are prepared. Then, they are used as the main-scanning direction detection portion and the sub-scanning direction detection portion. With such a configuration, their implementing load or cost can be reduced, and versatility of the ACS setting can be improved.

Figure 25B:
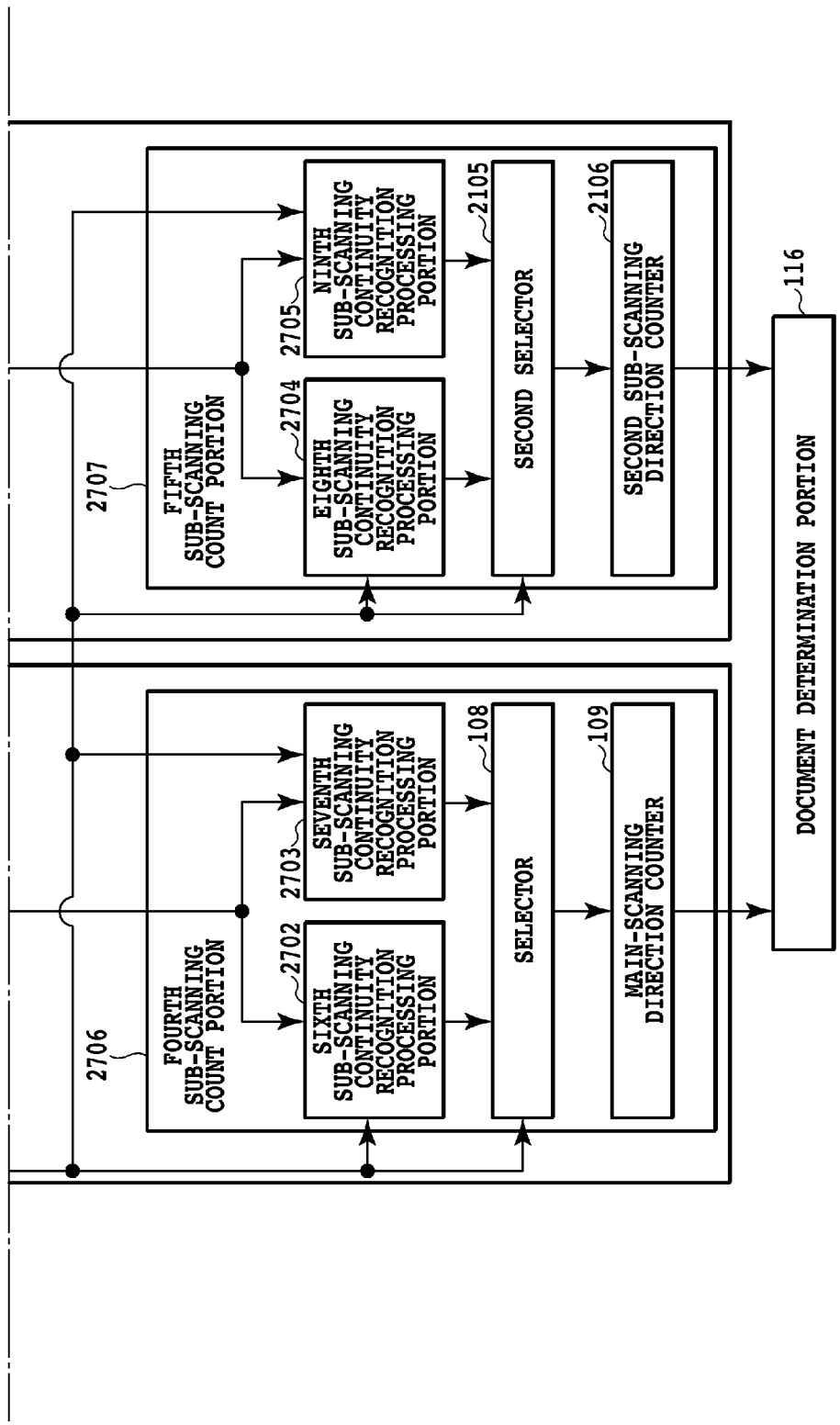

FIGS. 25A and 25B show processing blocks that realize a third embodiment of the ACS function, which is the present invention, and is configured as following.

Those given the same reference numerals as in FIGS. 1, 19A and 19B perform the above-described operations, respectively. In this embodiment, particularly, a control portion 2701 is newly provided that outputs an instruction for switching on whether or not the sixth, seventh, eighth, and ninth sub-scanning continuity recognition processing portions reset the counter or not at the boundary between the region with large color shift and the region without it.

Further, the main-scanning direction detection portion 110 in the second embodiment is replaced by a main-scanning detection portion 2708, the sub-scanning direction detection portion 2101 by a sub-scanning direction detection portion 2709, respectively. The main-scanning direction detection portion 110 and the sub-scanning direction detection portion 2101 perform processing in parallel, respectively. Then on the basis of the result of the color line drawing detected by each of them, the document determination portion 116 determines if the document to be processed is a color document or a monochrome document.

The control portion 2701 transmits a 2-bit signal on the basis of the setting, for example. Upon receipt of this signal, the sixth, seventh, eighth, and ninth sub-scanning continuity recognition processing portions (2702, 2703, 2704 and 2705) operate as shown in FIG. 24.

In the case of reset at the boundary between regions, the operation equal to that of the above-described first and second sub-scanning continuity recognition processing portions (106, 107) is performed. In the case of no reset at the boundary between the regions, the operation equal to that of the above-described fourth and fifth sub-scanning continuity recognition processing portions (2103, 2104) is performed.

As described above, the main-scanning detection portion 2708 and the sub-scanning detection portion 2709 are capable of realizing the operation of both of the above-described main-scanning detection portion 110 and the sub-scanning detection portion 2101 by means of the control portion 2701, and the versatility of the ACS setting is improved. In addition, since the main-scanning detection portion 2708 and the sub-scanning detection portion 2709 are performed in the same processing block, even if they are implemented by either one of an integrated circuit and software, their implementing load or cost can be reduced.

Other Embodiments

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-050853, filed Mar. 8, 2010, which is hereby incorporated by reference herein in its entirety.

What is claimed is:

1. An apparatus for determining whether an image including a first area, a second area, and a third area surrounding the first area and the second area is color, the apparatus comprising:
    (a) a first unit configured to determine whether each line in the first area and each line in the second area have color pixels that are continuous for a first length in a main-scanning direction without determining whether each line in the third area has color pixels that are continuous for the first length in the main-scanning direction;
    (b) a second unit configured to determine whether, in the first area, lines that have been determined to have color pixels that are continuous for the first length in the main-scanning direction are adjacent in a sub-scanning direction for a second length;
    (c) a third unit configured to determine whether, in the second area, lines that have been determined to have color pixels that are continuous for the first length in the main-scanning direction are adjacent in the sub-scanning direction for a third length longer than the second length;
    (d) a fourth unit configured to determine that the image is color in a case that the lines in the first area are determined to be adjacent in the sub-scanning direction for the second length, or the lines in the second area are determined to be adjacent in the sub-scanning direction for the third length, and to determine that the image is not color in a case that the lines in the first area are determined not to be adjacent in the sub-scanning direction for the second length, and the lines in the second area are determined not to be adjacent in the sub-scanning direction for the third length.

2. The apparatus according to claim 1, wherein the third area is an area at the edge of the image.

3. A method for determining whether an image including a first area, a second area, and a third area surrounding the first area and the second area is color, the method comprising:
    (a) a first determination step of determining whether each line in the first area and each line in the second area have color pixels that are continuous for a first length in a main-scanning direction without determining whether each line in the third area has color pixels that are continuous for the first length in the main-scanning direction;
    (b) a second determination step of determining whether, in the first area, lines that have been determined to have color pixels that are continuous for the first length in the main-scanning direction are adjacent in a sub-scanning direction for a second length;
    (c) a third determination step of determining whether, in the second area, lines that have been determined to have color pixels that are continuous for the first length in the main-scanning direction are adjacent in the sub-scanning direction for a third length longer than the second length;
    (d) a fourth determination step of determining that the image is color in a case that the lines in the first area are determined to be adjacent in the sub-scanning direction for the second length, or the lines in the second area are determined to be adjacent in the sub-scanning direction for the third length, and determining that the image is not color in a case that the lines in the first area are determined not to be adjacent in the sub-scanning direction for the second length, and the lines in the second area are determined not to be adjacent in the sub-scanning direction for the third length.

4. A non-transitory computer readable storage medium storing a program for causing a computer to perform the control method according to claim 3.

* * * * *